United States Patent
Gao et al.

(10) Patent No.: US 11,836,895 B2
(45) Date of Patent: Dec. 5, 2023

(54) DEEP-LEARNING BASED STRUCTURE RECONSTRUCTION METHOD AND APPARATUS

(71) Applicant: KING ABDULLAH UNIVERSITY OF SCIENCE AND TECHNOLOGY, Thuwal (SA)

(72) Inventors: Xin Gao, Thuwal (SA); Yu Li, Thuwal (SA); Renmin Han, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/848,780

(22) Filed: Jun. 24, 2022

(65) Prior Publication Data

US 2022/0343465 A1 Oct. 27, 2022

Related U.S. Application Data

(62) Division of application No. 16/961,376, filed as application No. PCT/IB2018/059636 on Dec. 4, 2018, now Pat. No. 11,403,735.

(Continued)

(51) Int. Cl.
*G06T 3/40* (2006.01)
*G01N 21/64* (2006.01)
(Continued)

(52) U.S. Cl.
CPC ....... *G06T 3/4076* (2013.01); *G01N 21/6458* (2013.01); *G06N 3/08* (2013.01);
(Continued)

(58) Field of Classification Search
None
See application file for complete search history.

(56) References Cited

U.S. PATENT DOCUMENTS

| 2013/0230221 A1* | 9/2013 | Bolstad | G06T 5/009 |
| | | | 382/128 |
| 2014/0118524 A1* | 5/2014 | Munck | G02B 21/008 |
| | | | 382/133 |

(Continued)

FOREIGN PATENT DOCUMENTS

JP     5969463 B2 *  8/2016  ......... G01N 21/6408

OTHER PUBLICATIONS

Yongliang Tang, Weiguo Gong, Xi Chen, Weihong Li, "Deep Inception-Residual Laplacian Pyramid Networks for Accurate Single Image Super-Resolution", https://doi.org/10.48550/arXiv.1711.05431 (Year: 2017).*

(Continued)

*Primary Examiner* — Jiangeng Sun
(74) *Attorney, Agent, or Firm* — PATENT PORTFOLIO BUILDERS PLLC

(57) ABSTRACT

A method for structure simulation for super-resolution fluorescence microscopy, the method including receiving a first image having a first resolution, which is indicative of a distribution of fluorophores; applying a Markov model to the fluorophores to indicate an emission state of the fluorophores; generating a plurality of second images, having the first resolution, based on the first image and the Markov model; adding DC background to the plurality of second images to generate a plurality of third images, having the first resolution; downsampling the plurality of third images to obtain a plurality of fourth images, which have a second resolution, lower than the first resolution; and generating a time-series, low-resolution images by adding noise to the plurality of fourth images. The time-series, low-resolution images have the second resolution.

8 Claims, 18 Drawing Sheets

Related U.S. Application Data

(60) Provisional application No. 62/621,642, filed on Jan. 25, 2018.

(51) Int. Cl.
    *G06N 3/08*     (2023.01)
    *G06T 5/00*     (2006.01)
    *G06T 5/20*     (2006.01)
    *G06T 5/50*     (2006.01)

(52) U.S. Cl.
    CPC ............ *G06T 3/4046* (2013.01); *G06T 5/002* (2013.01); *G06T 5/20* (2013.01); *G06T 5/50* (2013.01); *G06T 2207/10056* (2013.01); *G06T 2207/10064* (2013.01); *G06T 2207/20084* (2013.01)

(56) References Cited

U.S. PATENT DOCUMENTS

| | | | | |
|---|---|---|---|---|
| 2017/0193680 | A1* | 7/2017 | Zhang | G06V 30/2504 |
| 2017/0336326 | A1* | 11/2017 | Sirat | G02B 21/0056 |
| 2019/0129026 | A1* | 5/2019 | Sumi | G01S 15/8915 |

OTHER PUBLICATIONS

Abadi, M., "TensorFlow: Learning Functions at Scale," 21st ACM SIGPLAN International Conference on Functional Programming (ICFP 2016), Nara, Japan, Sep. 18-24, 2016, 1 page.

Cox, S., et al., "Bayesian localization microscopy reveals nanoscale podosome dynamics," Nature Methods, vol. 9, No. 2, Feb. 2012 (Published online Dec. 4, 2011), pp. 195-200.

Dai, H., et al., "Sequence2Vec: a novel embedding approach for modeling transcription factor binding affinity landscape," Bioinformatics, vol. 33, No. 22, 2017 (Advance Access Publication Jul. 27, 2017), pp. 3575-3583.

Dong, H., et al., "TensorLayer: A Versatile Library for Efficient Deep Learning Development," Proceedings of the 2017 ACM on Multimedia Conference (MM 2017), Mountain View, CA, USA, Oct. 23-27, 2017, 4 pages (arXiv:1707.08551v3 [cs.LG] submitted on Aug. 3, 2017).

Gal, Y., et al., "Dropout as a Bayesian Approximation: Representing Model Uncertainty in Deep Learning," Proceedings of the 33rd International Conference on Machine Learning, New York, NY, USA, JMLR: W&CP, vol. 48, 2016, 12 pages (arXiv:1506.02142v6 [stat.ML] submitted on Oct. 4, 2016).

Ghahramani, Z., et al., "Factorial Hidden Markov Models," Machine Learning, vol. 29, Issue 2-3, Nov. 1997, pp. 245-273 (pp. 1-31 provided).

Godsill, S.J., et al., "Monte Carlo Smoothing for Nonlinear Time Series," Journal of the American Statistical Association, Theory and Methods, vol. 99, No. 465, Mar. 2004 (Published online Jan. 1, 2012), pp. 156-168 (14 pages total).

Goodfellow, I.J., et al., "Generative Adversarial Nets," Part of Advances in Neural Information Processing Systems 27 (NIPS 2014), Proceedings of the International Conference on Neural Information Processing Systems (NIPS 2014), pp. 2672-2680 (pp. 1-9 provided) (arXiv:1406.2661v1 [stat.ML] submitted on Jun. 10, 2014).

Gustafsson, M.G.L., "Nonlinear structured-illumination microscopy: Wide-field fluorescence imagining with theoretically unlimited resolution," Proceedings of the National Academy of Sciences (PNAS), vol. 102, No. 37, Sep. 13, 2005, pp. 13081-13086.

Gustafsson, M.G.L., "Surpassing the lateral resolution limit by a factor of two using structured illumination microscopy," Journal of Microscopy, vol. 198, Pt. 2, May 2000, pp. 82-87.

He, K., et al., "Deep Residual Learning for Image Recognition," 2016 IEEE Conference on Computer Vision and Pattern Recognition (CVPR), Las Vegas, NV, USA, Jun. 27-30, 2016, pp. 770-778 (pp. 1-12 provided) (arXiv:1512.03385v1 [cs.CV] submitted on Dec. 10, 2015).

Hein, B., et al., "Stimulated emission depletion (STED) nanoscopy of a fluorescent protein-labeled organelle inside a living cell," Proceedings of the National Academy of Sciences (PNAS), vol. 105, No. 38, Sep. 23, 2008, pp. 14271-14276.

Hess, S.T., et al., "Ultra-High Resolution Imaging by Fluorescence Photoactivation Localization Microscopy," Biophysical Journal, vol. 91, No. 11, Dec. 2006, pp. 4258-4272.

Holden, S.J., et al., "DAOSTORM: an algorithm for high-density super-resolution microscopy," Nature Methods, vol. 8, No. 4, Apr. 2011, pp. 279-280.

Huang, F., et al., "Simultaneous multiple-emitter fitting for single molecule super-resolution-imaging," Biomedical Optics Express, vol. 2, No. 5, May 1, 2011, pp. 1377-1393.

Humblot, F., et al., "Super-Resolution Using Hidden Markov Model and Bayesian Detection Estimation Framework," EURASIP Journal on Applied Signal Processing, vol. 2006, Article ID 36971, 2006 (Published Dec. 1, 2006), pp. 1-16 (17 pages provided).

International Search Report (Form PCT/ISA/210) for corresponding/related International Application No. PCT/IB2018/059636, dated Feb. 20, 2019.

Johnson, J., et al., "Perceptual Losses for Real-Time Style Transfer and Super-Resolution," Proceedings of the 14th European Conference on Computer Vision (ECCV 2016), Amsterdam, The Netherlands, Oct. 11-14, 2016 (First Online Sep. 17, 2016), pp. 1-18 (arXiv:1603.08155v1 [cs.CV] submitted on Mar. 27, 2016).

Kim, J., et al., "Accurate Image Super-Resolution Using Very Deep Convolutional Networks," Proceedings of the IEEE Conference on Computer Vision and Pattern Recognition (2016 CVPR), Las Vegas, NV, USA, Jun. 27-Jun. 30, 2016, 9 pages (arXiv:1511.04587v2 [cs.CV] submitted on Nov. 11, 2016).

Kingma, D.P., et al., "Adam: A Method For Stochastic Optimization," 3rd International Conference for Learning Representations (ICLR 2015), San Diego, May 7-9, 2015, pp. 1-15 (arXiv:1412.6980v9 [cs.LG] submitted on Jan. 30, 2017).

Ledig, C., et al., "Photo-Realistic Single Image Super-Resolution Using a Generative Adversarial Network," 2016, pp. 1-19 (arXiv:1609.04802v5 [cs.CV] submitted on May 25, 2017; 2017 IEEE Conference on Computer Vision and Pattern Recognition (CVPR), Jul. 2017).

Li, Y., et al., "DEEPre: sequence-based enzyme EC number prediction by deep learning," Bioinformatics, vol. 34, No. 5, 2018 (Advance Access Publication Oct. 23, 2017), pp. 760-769.

Lidke, K.A., "Super resolution for common probes and common microscopes," Nature Methods, vol. 9, No. 2, 2012 (Available in PMC Jul. 30, 2013), pp. 139-141 (pp. 1-3 provided).

Lim, B., et al., "Enhanced Deep Residual Networks for Single Image Super-Resolution," 2017 IEEE Computer Society Conference on Computer Vision and Pattern Recognition Workshops (CVPRW), Honolulu, HI, USA, Jul. 21-26, 2017, 9 pages (arXiv:1707.02921v1 [cs.CV] submitted on Jul. 10, 2017).

Lippincott-Schwartz, J., et al., "Putting super-resolution fluorescence microscopy to work," Nature Methods, vol. 6, No. 1, Jan. 2009 (available in PMC May 20, 2013), pp. 1-7.

Litjens, G., et al., "A survey on deep learning in medical image analysis," Medical Image Analysis, vol. 42, Dec. 2017 (Available online Jul. 26, 2017), pp. 60-88.

Quan, T., et al., "High-density localization of active molecules using Structured Sparse Model and Bayesian Information Criterion," Optics Express, vol. 19, No. 18, Aug. 29, 2011 (Published Aug. 15, 2011), pp. 16963-16974.

Rabiner, L.R., "A Tutorial on Hidden Markov Models and Selected Applications in Speech Recognition," Proceedings of the IEEE, vol. 77, No. 2, Feb. 1989, pp. 257-286.

Ram, S., et al., "Beyond Rayleigh's criterion: A resolution measure with application to single-molecule microscopy," Proceedings of the National Academy of Sciences (PNAS), vol. 103, No. 12, Mar. 21, 2006, pp. 4457-4462.

Russakovsky, O., et al., "ImageNet Large Scale Visual Recognition Challenge," International Journal of Computer Vision, vol. 115,

(56) References Cited

OTHER PUBLICATIONS

Dec. 2015 (Published Apr. 11, 2015), pp. 211-252 (arXiv:1409.0575v3 [cs.CV] submitted on Jan. 30, 2015; pp. 1-43 provided).

Rust, M.J., et al., "Stochastic optical reconstruction microscopy (STORM) provides sub-diffraction-limit image resolution," Nature Methods, vol. 3, No. 10, Oct. 2006 (available in PMC Jun. 23, 2009), pp. 793-795 (pp. 1-7 provided).

Sage, D., et al., "Quantitative evaluation of software packages for single-molecule localization microscopy," Nature Methods, vol. 12, No. 8, Aug. 2015 (Published online Jun. 15, 2015), pp. 717-724 (12 pages provided).

Salimans, T., et al., "Improved Techniques for Training GANs," CoRR abs/1606.03498, 2016, pp. 1-10 (arXiv:1606.03498v1 [cs.LG] submitted on Jun. 10, 2016).

Sangkloy, P., et al., "The Sketchy Database: Learning to Retrieve Badly Drawn Bunnies," ACM Transactions on Graphics, vol. 35, No. 4, Article 119, Jul. 2016, 12 pages.

Schwentker, M.A., et al., "Wide-Field Subdiffraction RESOLFT Microscopy Using Fluorescent Protein Photoswitching," Microscopy Research and Technique, vol. 70, 2007 (Published online Jan. 29, 2007), pp. 269-280.

Simonyan, K., et al., "Very Deep Convolutional Networks for Large-Scale Image Recognition," Published as a Conference Paper at ICLR 2015, 14 pages (arXiv:1409.1556v6 [cs.CV] submitted on Apr. 10, 2015).

Small, A.R., "Theoretical Limits on Errors and Acquisition Rates in Localizing Switchable Fluorophores," Biophysical Journal: Biophysical Letters, vol. 96, Issue 2, Jan. 21, 2009, pp. L16-L18.

Tian, J., et al., "A survey on super-resolution imaging," Signal, Image and Video Processing, vol. 5, 2011 (Published online Feb. 3, 2011), pp. 329-342.

Written Opinion of the International Searching Authority (Form PCT/ISA/237) for corresponding/related International Application No. PCT/IB2018/059636, dated Feb. 20, 2019.

Xu, F., et al., "Bayesian localization microscopy based on intensity distribution of fluorophores," Protein & Cell, vol. 6, Issue 3, Mar. 2015 (Published Feb. 12, 2015), pp. 211-220.

Xu, F., et al., "Live cell single molecule-guided Bayesian localization super resolution microscopy," Cell Research, vol. 27, No. 5, May 2017 (Published online Dec. 30, 2016), pp. 713-716.

Zhang, M., et al., "Rational design of true monomeric and bright photoactivatable fluorescent proteins," Nature Methods, vol. 9, No. 7, Jul. 2012 (Published online May 13, 2012), pp. 727-729 (6 pages provided).

Zhu, L., et al., "Faster STORM using compressed sensing," Nature Methods, vol. 9, No. 7, Jul. 2012 (Published online Apr. 22, 2012), pp. 721-723 (6 pages provided).

\* cited by examiner

DEEP-LEARNING BASED STRUCTURE RECONSTRUCTION METHOD AND APPARATUS

CROSS-REFERENCE TO RELATED APPLICATIONS

This application is a Divisional Application of U.S. National Stage application Ser. No. 16/961,376, filed on Jul. 10, 2020, which claims priority to International Application No. PCT/IB2018/059636, filed on Dec. 4, 2018, which claims priority to U.S. Provisional Patent Application No. 62/621,642, filed on Jan. 25, 2018, entitled "DLBI: DEEP LEARNING GUIDED BAYESIAN INFERENCE FOR STRUCTURE RECONSTRUCTION OF SUPER-RESOLUTION FLUORESCENCE MICROSCOPY," the disclosure of which is incorporated herein by reference in its entirety.

BACKGROUND

Technical Field

Embodiments of the subject matter disclosed herein generally relate to a system and method for generating a super-resolution fluorescence microscopy image, and more specifically, to techniques for structure reconstruction of super-resolution fluorescence microscopy.

Discussion of the Background

Fluorescence microscopy imaging with a resolution beyond the diffraction limit of light (which is called super-resolution in the art) is playing an important role in biological sciences. The application of super-resolution fluorescence microscope techniques to living-cell imaging promises dynamic information on complex biological structures with nanometer-scale resolution.

Recent developments of fluorescence microscopy takes advantage of both the development of optical theories and computational methods. Living cell stimulated emission depletion (STED) (Hein et al., 2008), reversible saturable optical linear fluorescence transitions (RESOLFT) (A Schwentker et al., 2007), and structured illumination microscopy (SIM) (Gustafsson, 2005) focus on the innovation of instruments, which requires sophisticated, expensive optical setups and specialized expertise for accurate optical alignment. The time-series analysis based on localization microscopy techniques, such as photoactivatable localization microscopy (PALM) (Hess et al., 2006) and stochastic optical reconstruction microscopy (STORM) (Rust et al., 2006), is mainly based on the computational methods, which build a super-resolution image from the localized positions of single molecules in a large number of images. When compared with STED, RESOLFT and SIM, the PALM and STORM approaches do not need specialized microscopes, but the localization techniques of PALM and STORM approaches require the fluorescence emission from individual fluorophores to not overlap with each other, leading to long imaging time and increased damage to live samples (Lippincott-Schwartz and Manley, 2009).

More recent methods (Holden et al., 2011; Huang et al., 2011; Quan et al., 2011; Zhu et al., 2012) alleviate the long exposure problem by developing multiple-fluorophore fitting techniques to allow relatively dense fluorescent data, but still do not solve the above problem completely.

Deep learning has accomplished great success in various fields, including super-resolution imaging (Ledig et al., 2016; Kim et al., 2016; Lim et al., 2017). Among different deep learning architectures, the generative adversarial network (GAN) (Goodfellow et al., 2014) achieved the state-of-the-art performance on single image super-resolution (SISR) (Ledig et al., 2016). However, there are two fundamental differences between the SISR and super-resolution fluorescence microscopy. First, the input of SISR is a downsampled (i.e., low-resolution) image of a static high-resolution image and the expected output is the original image, whereas the input of super-resolution fluorescence microscopy is a time-series of low-resolution fluorescent images and the output is the high-resolution image containing estimated locations of the fluorophores (i.e., the reconstructed structure). Second, the nature of SISR ensures that there are readily a large amount of data to train deep learning models, whereas for fluorescence microscopy, there are only limited time-series datasets. Furthermore, most of the existing fluorescence microscopy datasets do not have the ground-truth high-resolution images, which make supervised deep learning infeasible and impractical.

Thus, there is a need to provide a deep learning module that is compatible with the time-series of low-resolution fluorescence images of the super-resolution fluorescence microscopy and also to be able to train the deep learning module with reliable ground-truth high-resolution images.

SUMMARY

According to an embodiment, there is a method for structure simulation for super-resolution fluorescence microscopy. The method includes receiving a first image having a first resolution, which is indicative of a distribution of fluorophores, applying a Markov model to the fluorophores to indicate an emission state of the fluorophores, generating a plurality of second images, having the first resolution, based on the first image and the Markov model, adding DC background to the plurality of second images to generate a plurality of third images, having the first resolution, downsampling the plurality of third images to obtain a plurality of fourth images, which have a second resolution, lower than the first resolution, and generating a time-series, low-resolution images by adding noise to the plurality of fourth images. The time-series, low-resolution images have the second resolution.

According to another embodiment, there is a computing device for simulating a structure for super-resolution fluorescence microscopy. The computing device includes an interface for receiving a first image having a first resolution, which is indicative of a distribution of fluorophores; and a processor connected to the interface. The processor is configured to apply a Markov model to the fluorophores to indicate an emission state of the fluorophores; generate a plurality of second images, having the first resolution, based on the first image and the Markov model; add DC background to the plurality of second images to generate a plurality of third images, having the first resolution; downsample the plurality of third images to obtain a plurality of fourth images, which have a second resolution, lower than the first resolution; and generate a time-series, low-resolution images by adding noise to the plurality of fourth images. The time-series, low-resolution images have the second resolution.

According to still another embodiment, there is a method for generating a super-resolution image, the method including receiving a time-series of fluorescent images having a first resolution; processing the time-series of fluorescent images with a residual network module to generate denoised images; and multiscale upsampling the denoised images with a multiscale upsampling component for generating the super-resolution image, having a second resolution. The second resolution is larger than the first resolution, and the second resolution is beyond a diffraction limit of light.

According to yet another embodiment, there is a computing device for generating a structure for super-resolution fluorescence microscopy, the computing device including an interface for receiving a time-series of fluorescent images having a first resolution; and a processor connected to the interface and configured to, process the time-series of fluorescent images with a residual network module to generate denoised images; and multiscale upsample the denoised images with a multiscale upsampling component for generating the super-resolution image, having a second resolution. The second resolution is larger than the first resolution, and the second resolution is beyond a diffraction limit of light.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
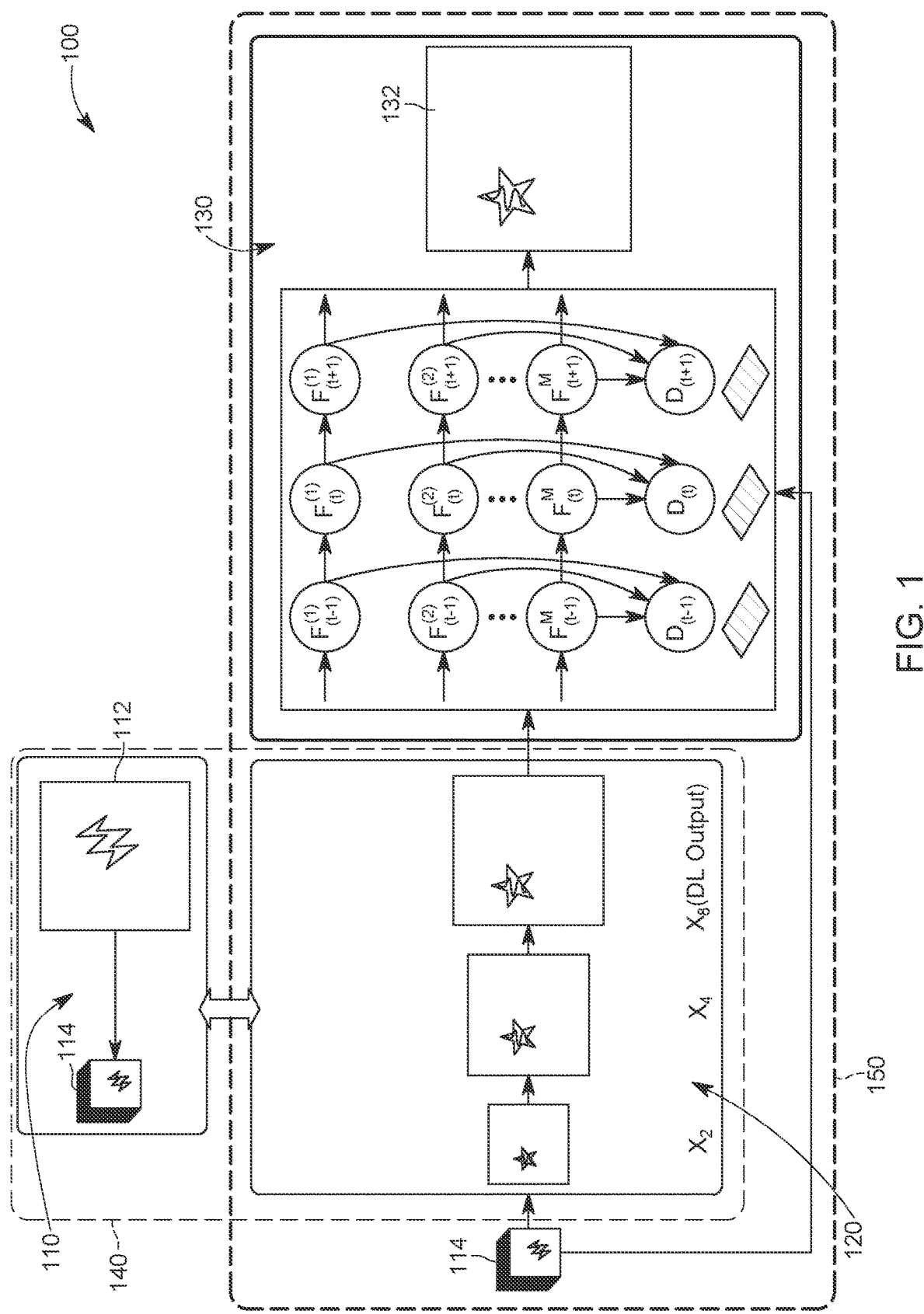
FIG. 1 is a schematic illustration of a deep learning system for structure reconstruction of super-fluorescence microscopy.

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for deep-learning structure reconstruction based on a time-series analysis of high-density fluorescent images. This method uses the strength of deep learning for capturing the underlying distribution of the fluorophores that are consistent with the observed time-series fluorescent images by exploring local features and correlation along time-axis. The method uses two components, a simulator module that takes a high-resolution image as the input, and simulates time-series low-resolution fluorescent images based on experimentally calibrated parameters, which provides supervised training data to the deep learning model. The second component is a multi-scale deep learning module that captures both spatial information in each input low-resolution image as well as temporal information among the time-series images. Experimental results on both real and simulated datasets are presented and they demonstrate that this novel method provides more accurate and realistic local patch and large-field reconstruction than the state-of-the-art method, the 3B analysis (to be discussed later), while this novel method is also more than two orders of magnitude faster.

The method to be discussed next is designed for imaging biological structures with sub-diffraction limit resolution. More specifically, the method is designed for high-resolution fluorescence microscopy. Fluorescence microscopy is a widely used technique in molecular and cell biology for non-invasive, time-resolved imaging with high biochemical specificity. However, the traditional fluorescence microscopy images are limited for ultra-structural imagining due to a resolution limit, which is set by the diffraction of light. Thus, it is not possible with a physical device that uses light of a given wavelength to generate an image that has a lateral resolution better than approximately half of the wavelength of the used light.

In the case of fluorescence microscopy, the absorption and subsequent re-radiation of light by organic and inorganic specimens is typically the result of well-established physical phenomena described as being either fluorescence or phosphorescence. The emission of light through the fluorescence process is nearly simultaneous with the absorption of the excitation light due to a relatively short time delay between photon absorption and emission, ranging usually less than a microsecond in duration.

The method to be discussed next improves the lateral (and depth) resolution of an image generated with a fluorescence microscope by manipulating the acquired image. While the acquired image is a low-resolution image, a refined image that has a higher resolution will be outputted. Then, if the acquired image is considered to be a high-resolution image, the improved image that is obtained by processing the high-resolution image is a super-resolution image, i.e., it has a higher resolution than the high-resolution image. The super-resolution image is obtained by using a deep learning algorithm that is trained on plural images generated in a controlled way. This controlled way of generating the plural images with which the deep learning module is trained, makes possible the generation of the super-resolution image.

The method to be discussed now may be implemented in a computing system (details of the hardware components and connections of such a system are discussed later) 100, as illustrated in FIG. 1, that includes two modules, Simulation module 110 and the Deep Learning module 120. The computing system 100 may also include a Bayesian module 130. However, this module is optional. Each module may be implemented in hardware in a dedicated part of the computing system, or exclusively in software, or as a combination of hardware and software. The Simulation module 110 and the Deep Learning module 120 may be used together during a training mode 140 for training the system, as discussed later, and the Deep Learning module 120 alone or in combination with the Bayesian module 130 may be used during an analyzing mode 150 for analyzing various biological components. Each module is now discussed in turn.

The Simulation module 110 is shown in FIG. 1 as receiving as input a high-resolution image 112 and generating as output plural, simulated, noisy, low-resolution images 114. The high-resolution image has a resolution higher than the low resolution image. Note that the input high resolution-image 114 may be obtained from an existing collection of images, may be generated with a fluorescence microscope, or may be obtained in any other possible way. The input high-resolution image 114 needs to show various structures (called herein fluorophores) with enough clarity so that the Deep Learning module can be trained. A fluorophore is defined herein as a fluorescent protein that can re-emit light upon light excitation. Thus, the term fluorophore is equivalent herein with the term fluorescent protein.

The Simulation module 110 is useful for the following reasons. Although deep learning has proved its great superiority in various fields, it has not been used for fluorescent microscopy image analysis. One of the possible reasons is the lack of supervised training data, which means the number of time-series low-resolution image datasets is limited and even for the existing datasets, the ground-truth high-resolution images are often unknown. Because of the lack of ground-truth high-resolution images, it is not possible to train a Deep Learning module in the fluorescence field. Therefore, the Simulation module 114 is designed herein to generate ground-truth high-resolution images that will be used by the Deep Learning module 120 for training (i.e., the Simulation module would generate ground-truth high-resolution images). In one embodiment, a stochastic simulation based on experimentally calibrated parameters is implemented in the Simulation module 114 to solve this issue, without the need of collecting a massive amount of actual fluorescent images. This empowers the Deep Learning module 120 to effectively learn the latent structures under the low-resolution, high-noise and stochastic fluorescing conditions. If the primitive super-resolution images produced by the deep neural network of the Deep Learning module 120 may still contain artifacts and lack physical meaning, it is possible to use a Bayesian inference module based on the mechanism of fluorophore switching to produce high-confident images.

The method advantageously uses the strength of deep learning, which captures the underlying distribution that generates the training super-resolution images by exploring local features and correlation along time-axis.

As noted above, the Simulation module 110 uses a stochastic simulation approach. This means that the input of the Simulation module 110 is a high-resolution image 112 that depicts the distribution of the fluorophores and the output is a time-series of low-resolution fluorescent images 114 with different fluorescing states.

In one embodiment, Laplace-filtered natural images and sketches are used as the ground-truth high-resolution images that contain the fluorophore distribution. If a gray-scale image is given, the depicted shapes are considered as the distribution of fluorophores and each pixel value on the image is considered as the density of fluorophores at that location. The Simulation module 110 then creates a number of simulated fluorophores that are distributed according to the distribution and the densities of the input image. For each fluorophore, the Simulation module is configured to switch its state according to a Markov model, i.e., among states of emitting (activated), not emitting (inactivated), and bleached (cannot ever emit again). The emitting state means that the fluorophore emits photons and a spot according to the point spread function (PSF) is depicted on a canvas (i.e., a generated image). The PSF describes the response of an imaging system to a point source or point object. In this regard, the full width at half maximum (FWHM) is an expression, illustrated in FIG. 2, of the extent of a function F, given by a difference between the two extreme values X1 and X2 of the independent variable x at which the dependent variable y is equal to half of its maximum value a. In the example shown in FIG. 2, the function is a Gaussian PSF. Considering all the spots of the emitting fluorophores results in a high-resolution fluorescent image.

Figure 3:
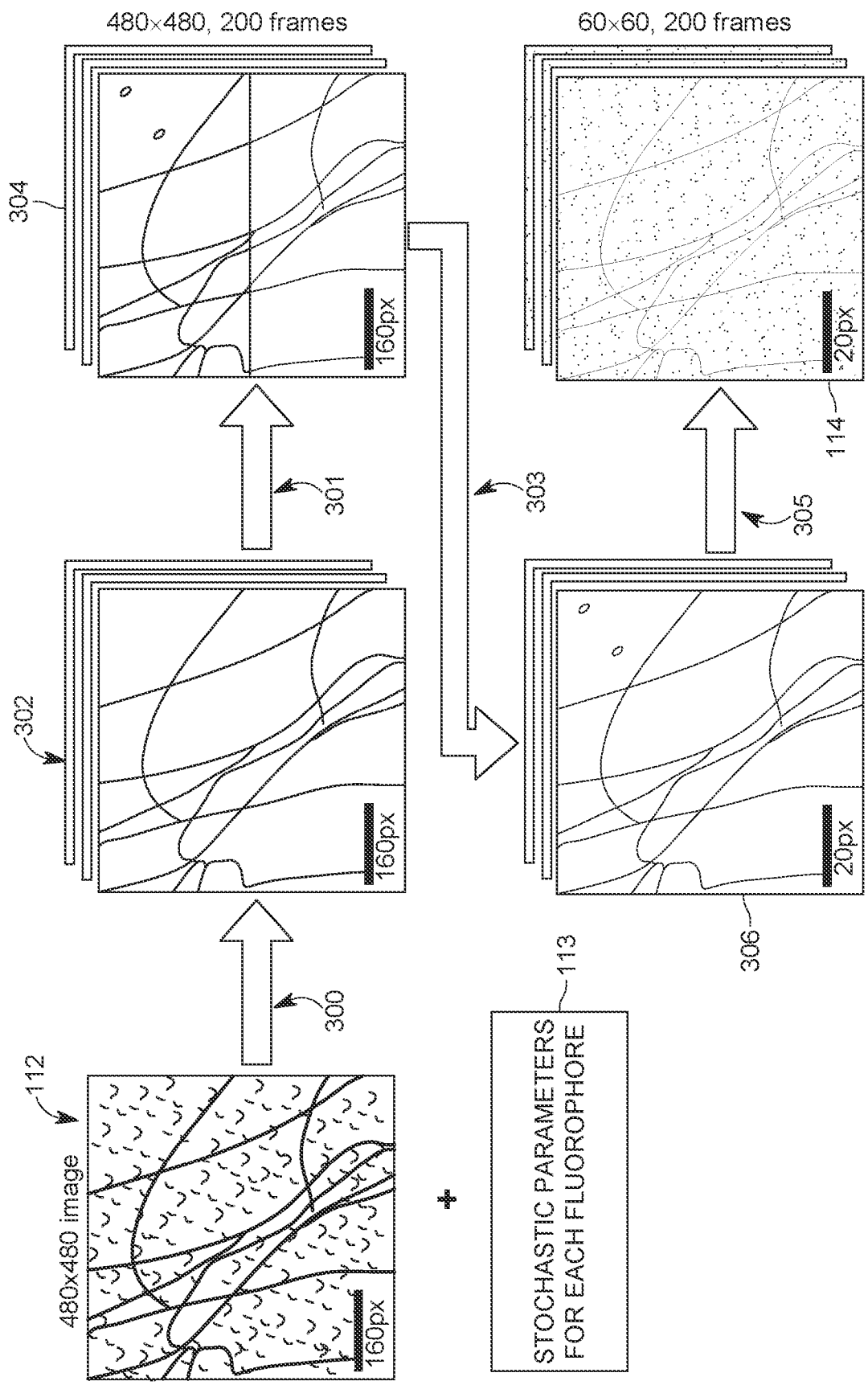
FIG. 3 illustrates the steps performed by a simulation module for generating a time-series of low-resolution images.

The logic embedded into the Simulation module 110 is now discussed with regard to FIG. 3. Applying a Markov model, in step 300, to the initial high-resolution image 112, as illustrated in FIG. 3, generates a time-series of high-resolution images 302. After adding the background in step 301, to the time-series of high-resolution images 302, the plural high-resolution images 304 are obtained. Then, in step 303, the plural high-resolution images with background 304 are downsampled to plural low-resolution images 306 and noise is added in step 305 to obtain the low-resolution images with noise 114. It is noted that in this specific implementation of the Simulation module 110, the original high-resolution image 112 has a 480×480 resolution and the low-resolution images 114 have a 60×60 resolution. Those skilled in the art would understand that other resolutions may be used. Further, it is noted that in this embodiment, 200 time-series, low-resolution images 114 were generated from the original high-resolution image 112. Another number of low-resolution images 114 may be used as long as these images from a time-series. A time-series is understood in this context as being the result of the Markov model, which models the emission of photons for a protein over time and as these emissions change in time, a time-series of images are generated.

The accuracy of the Simulation module 110 is influenced by three factors: (i) the principles of the linear optical system (i.e., the microscopy system), (ii) the experimentally calibrated parameters of the fluorophores, and (iii) the stochastic modeling. These factors are now discussed in more detail.

With regard to the first factor, the linear optical system, a fluorescence microscope is considered to be a linear optical system, in which the superposition principle is valid, i.e., Image(Obj1+Obj2)=Image(Obj1)+Image(Obj2). The behavior of fluorophoresis considered to be invariant to a mutual interaction between different fluorophores. Therefore, for high-density fluorescent images, the pixel density can be directly calculated from the light emitted from its surrounding fluorophores.

Figure 2:
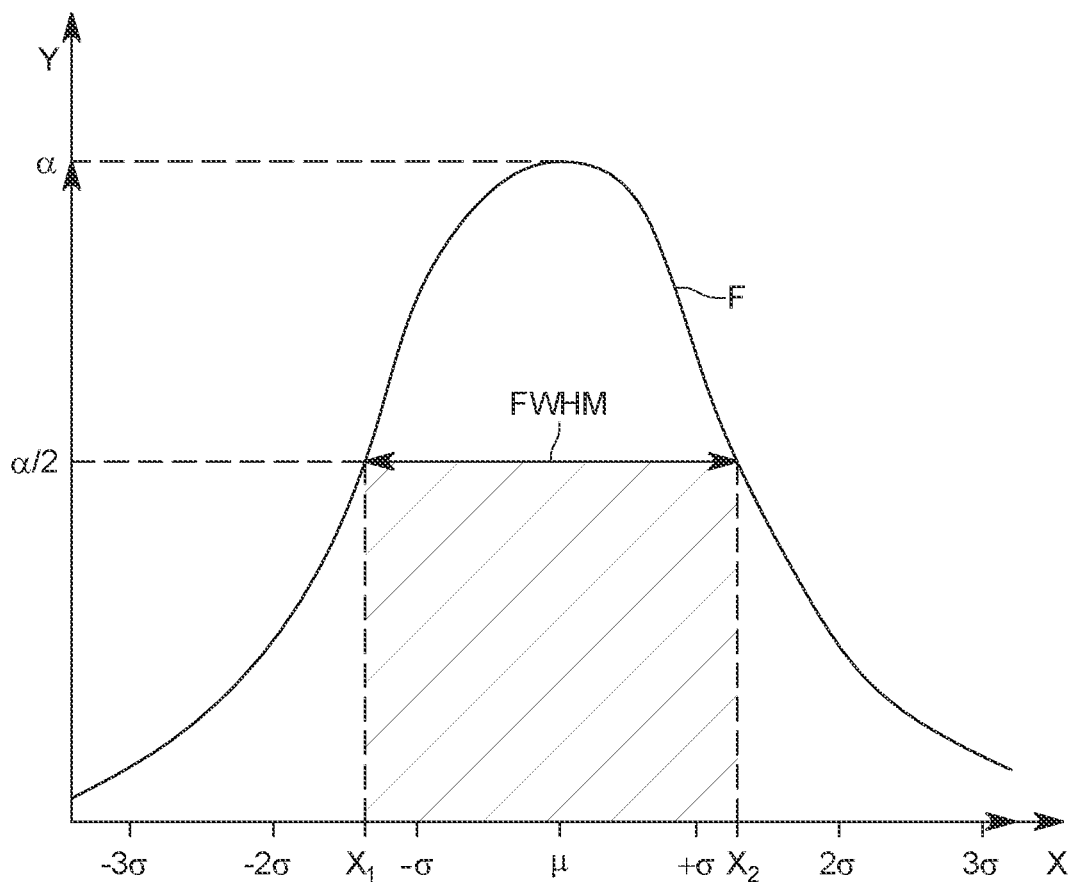
FIG. 2 illustrates the point spread function associated with the deep learning system for structure reconstruction of super-fluorescence microscopy.

When a fluorophore is activated (i.e., it emits a photon), an observable spot (the photon) can be recorded by a sensor, and the shape of the spot is described by a point spread function (PSF discussed with regard to FIG. 2). Considering the limitations of the physical sensor's capabilities, the PSF of an isotropic point source is often approximated as a Gaussian function, which can be mathematically expressed as:

$$I(x, y) = I_0 \exp\left(-\frac{1}{2\sigma^2}\left((x-x_0)^2 + (y-y_0)^2\right)\right), \quad (1)$$

where σ is calculated from the fluorophore in the specimen that specifies the width of the PSF, $I_0$ is the peak intensity and is proportional with the photon emission rate and the single-frame acquisition time, and ($x_0$, $y_0$) is the location of the fluorophore.

While the PSF describes the shape of the observable spot of the activated fluorophore, the full width at half maximum (FWHM) describes the distinguishability of the spot. If the PSF is modeled as a Gaussian function as illustrated in FIG. 2, the relationship between FWHM and σ is given by:

$$\text{FWHM} = 2\sqrt{2\ln 2}\ \sigma \approx 2.355\ \sigma. \quad (2)$$

Considering the probability of the linear optical system, a high-density fluorescent image is composed by the PSFs of the fluorophores present in that image. These stochastic parameters 113 (e.g., PSF and FWHM) for each fluorophore are schematically shown in FIG. 3 as being used for generating the time-series of the high-resolution image 302.

The second factor discussed above is the calibrated parameters of the fluorophores. In most imaging systems, the characteristics of a fluorescent protein can be calibrated by experimental techniques, i.e., known proteins are used in the lab to characterize their photon emissions at various locations ($x_0$, $y_0$). With all the calibrated parameters, it is then possible to describe and simulate the fluorescent switching of a specialized protein.

Figure 4:
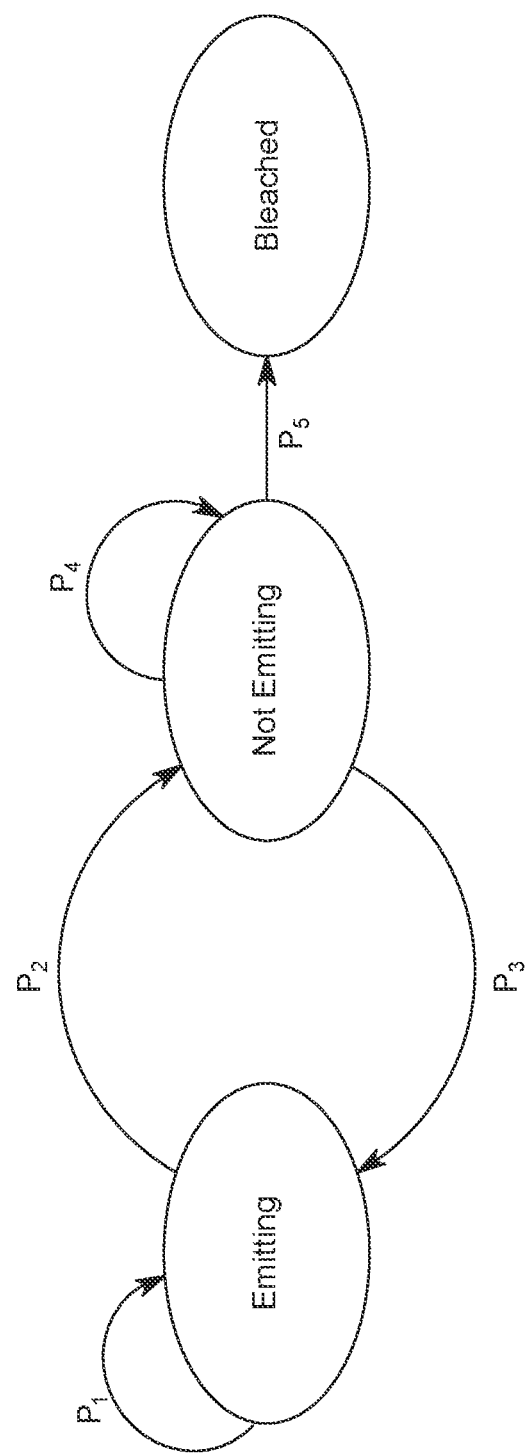
FIG. 4 illustrates a Markov model for describing state transitions of a fluorophore.

The first parameter of a fluorophore is its switching probability. A fluorophore always transfers among three states, (1) emitting, (2) not emitting, and (3) bleached. The likelihood to transfer from any one of these three states to another state can be specified (described or modelled) by a Markov model as illustrated in FIG. 4. Note that FIG. 4 shows three possible states of a fluorophore, the probabilities P2, P3, and P5 to change from any state to another state, and the probabilities P1 and P4 to remain in the same state. If the fluorophore jumps from the not emitting state to the bleached state, it will not emit a photon anymore. For this reason, there is no probability associated with the bleached state and no possible way to return from the bleached state to another state. As with the linear optics principle, each fluorophore's transitions are assumed to be independent from each other. Further, it is assumed that the value of each probability P1 to P5 is known for any given fluorophore.

The second parameter of a fluorophore is its PSF. When a real-world fluorophore is activated, the emitted photons and its corresponding PSF will not stay constant over time. The stochasticity of the PSF and photon strength describes the characteristics of a fluorescent protein. To accurately simulate the fluorescence, these properties need to be taken into account. In this embodiment, the parameters related to these properties can be well-calibrated. The PSF and FWHM of a fluorescent protein can be measured in low molecule density. In an instrument for PALM or STORM, the PSF of the microscope can be measured by acquiring image frames, fitting the fluorescent spots parameter, normalizing and then averaging the aligned single-molecule images. The distribution of FWHM can be obtained from statistical analysis. The principle of linear optics ensures that the parameters measured in single-molecule conditions is also applicable to high-density conditions.

In this embodiment, a log-normal distribution (Cox et al., 2012; Zhu et al., 2012), described in FIG. 3 by the stochastic parameters 113, is used to approximate the experimentally measured single fluorophore photon number distribution. The stochastic parameters 113 associated with a fluorophore include the PSF and FWHM of the fluorophore. A table of fluorophore's experimentally calibrated FWHM parameters is used to initialize the PSF probabilities P1 to P5 shown in FIG. 4, according to equations (1) and (2). Then, for each fluorophore recorded in the high-resolution image 112, the state of the current image frame is calculated according to the transfer values [P1, P2, P3, P4, P5] and a random PSF shape is produced if the corresponding fluorophore is in the "emitting" state. This procedure is repeated for each fluorophore, which results in the final fluorescent image that is fed to the Simulation module 110.

The third factor that affects the Simulation module 110 is the stochastic modeling. The illumination of real-world objects is different at various times. In general, the illumination change of the real-world objects can be suppressed by high-pass filtering with a large Gaussian kernel. However, this operation will sharpen the random noise and cannot remove the background (or DC offset). The DC offset, DC bias or DC component denotes the mean value of a signal. If the mean amplitude is zero, there is no DC effect. For most microscopy, the DC offset can be calibrated, but cannot be completely removed. To make the modeling more realistic, several stochastic factors are introduced. First, for a series of simulated fluorescent images, a background value (see step 301 in FIG. 4) is calculated from the multiplication between (1) a random strength factor and (2) the average image intensity and is added to the fluorescent images 302 to simulate the DC offset. For the same time-series, the strength factor remains unchanged, but the background strength changes with the image intensity. Second, the high-resolution fluorescent images 304 are downsampled in step 303 and random Gaussian noise is added in step 305 to the low-resolution images 306. Here, the noise is also stochastic for different time-series and close to the noise strength that is measured from the real-world microscopy.

The default setting of the simulation illustrated in FIG. 4 takes a 480×480 pixel high-resolution image 112 as the input and simulates 200 frames of 60×60 pixel (i.e., 8× binned) low-resolution images 114.

Figure 5:
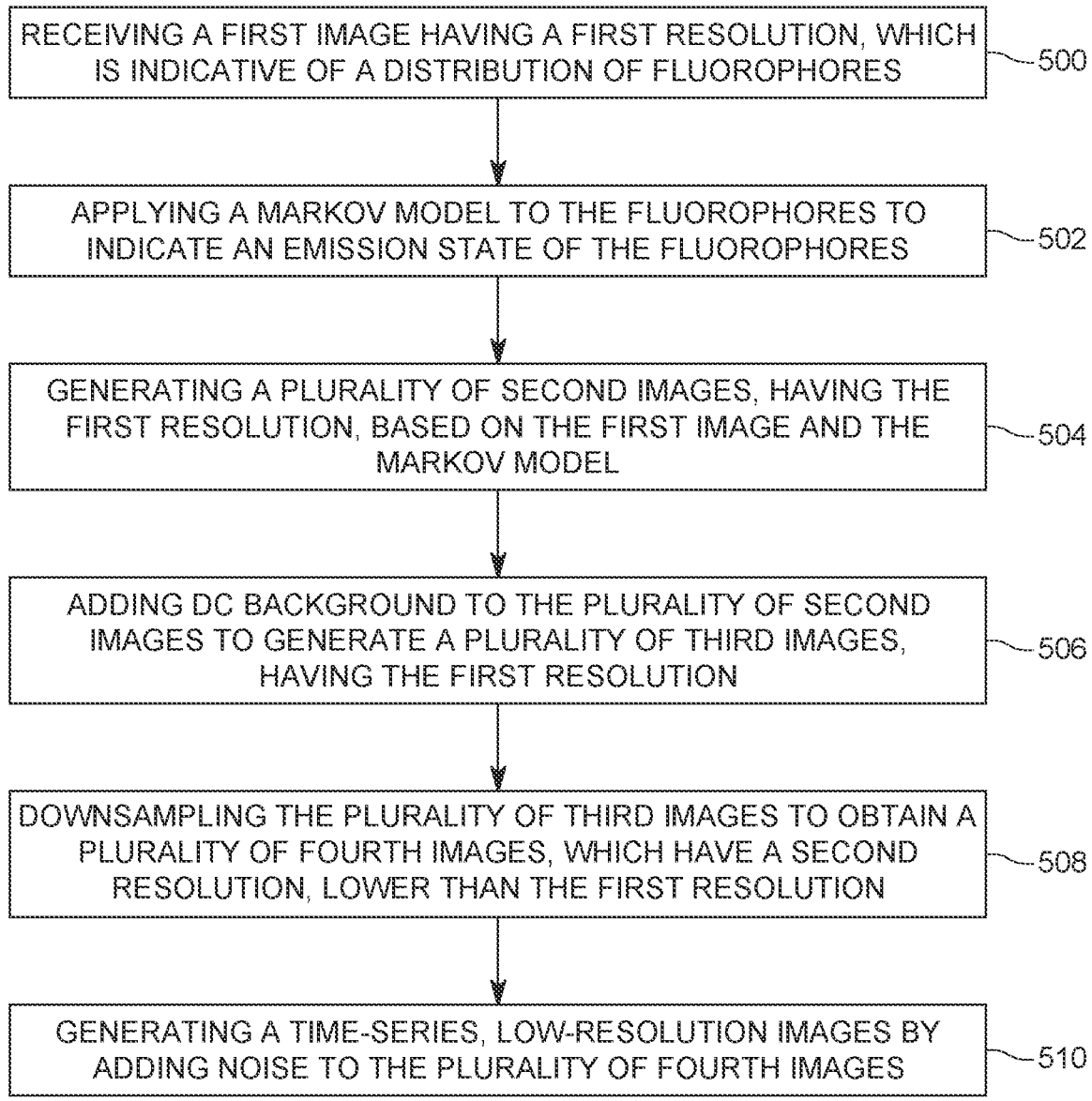
FIG. 5 is a flowchart of a method for generating the time-series of low-resolution images.

A flowchart of a method for generating the low-resolution images 114 is now discussed with regard to FIG. 5. The method includes a step 500 of receiving a first image 112 having a first resolution, which is indicative of a distribution of fluorophores, a step 502 of applying a Markov model (see FIG. 4) to the fluorophores to indicate an emission state of the fluorophores, a step 504 of generating a plurality of second images 302, having the first resolution, based on the first image 112 and the Markov model, a step 506 of adding DC background to the time-series plurality of second images 302 to generate a plurality of third images 304, having the first resolution, a step 508 of downsampling the plurality of third images 304 to obtain a plurality of fourth images 306, which have a second resolution, lower than the first resolution, and a step 510 of generating a time-series, low-resolution images 114 by adding noise to the plurality of fourth images, where the time-series, low-resolution images 114 have the second resolution.

In one application, the step of applying a Markov model uses experimentally calibrated parameters. The experimentally calibrated parameters describe a fluorescent protein. A first parameter of the experimentally calibrated parameters is a switching probability between two of three possible states. The switching probabilities between the three possible states are known. A second parameter of the experimentally calibrated parameters is a point spread function of a fluorophore. In one application, the second resolution is 8 times smaller than the first resolution.

Figure 6:
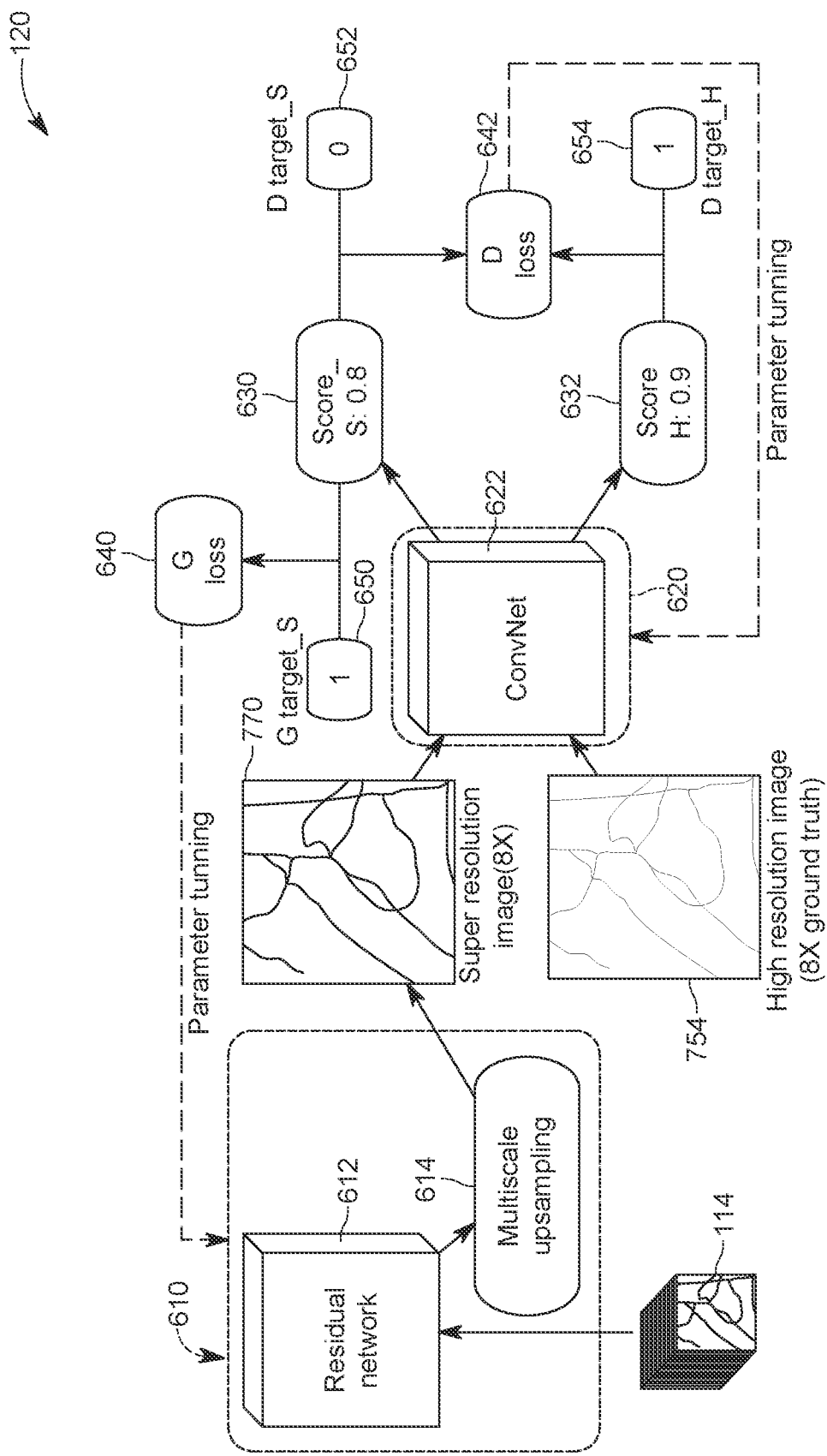
FIG. 6 is a schematic illustration of a deep learning module that generates a super-resolution image.

The low-resolution images 114 are now used by the Deep Learning module 120 to learn the characteristics of the fluorophores. In this embodiment, a deep residual network is built under the generative adversarial network (GAN) framework (Goodfellow et al., 2014; Lediget al., 2016) to estimate the primitive super-resolution image $I^{S\ R}$ (the latent structure features) from the time-series of low-resolution fluorescent images 114T={$I_k^{FL}$}, k=1 ... K, where K is the total number of low-resolution fluorescent images (e.g., K is 200 in FIG. 3). Different from the traditional methods where only one generative model is built, this embodiment builds a pair of models, a generator model, G, which produces the estimation of the underling structure of the training images, and a discriminator model, D, which is trained to distinguish the reconstructed super-resolution image from the ground-truth one. FIG. 6 is an overview of such deep learning logic that is implemented in the Deep Learning module 120 and shows the generator model 610 and the discriminator model 620.

A goal of training a generator neural network is to obtain the optimized parameters, $\theta_G$, for the generating function, G, with the minimum difference between the output super-resolution image, $I^{S\ R}$, and ground-truth image, $I^{HR}$. The parameter is given by:

$$\hat{\theta}_G = \underset{\theta_G}{\mathrm{argmin}} \frac{1}{N} \sum_{n=1}^{N} l^{SR}(G(\mathcal{T}_n, \theta_G), I_n^{HR}), \quad (3)$$

where $G(\mathcal{T}_n, \theta_G)$ is the generated super-resolution image by the generator model G for the $n^{th}$ training sample, N is the number of training images, and $I^{S\ R}$ is a loss function that will be specified later.

For the discriminator network D, D(x) represents the probability of the data being the real high-resolution image rather than from the generator model G. When training D, this embodiment tries to maximize its ability to differentiate ground-truth from the generated image $I^{SR}$, to force the generator model G to learn better the details. When training the generator model G, this embodiment tries to maximize the expression log(1−D(G($\mathcal{T}_n$, $\theta_G$), $\theta_D$), which is the log likelihood of D being able to tell that the image generated by G is not ground-truth. That is, according to this embodiment, the process minimax (i.e., minimizing the possible loss for a worst case (maximum loss) scenario) uses the following function:

$$\underset{\theta_G}{\min} \underset{\theta_D}{\max} \mathbb{E}_{I^{HR} \sim p_{train}(I^{HR})}[\log(D(I^{HR}, \theta_D))] + \quad (4)$$

$$\mathbb{E}_{I^{HR} \sim p_{G(\mathcal{T})}}[\log(1 - D(G(\mathcal{T}_n, \theta_G), \theta_D)],$$

where E is the expectation operation, $I^{HR} \sim p_{train}$ means that $I^{HR}$ is drawn from the train data, and $I^{HR} \sim p_{G(\mathcal{T})}$ means that $I^{HR}$ is generated by the generator.

In this way, the generator is forced to optimize the generative loss, which is composed of (1) perceptual loss, (2) content loss, and (3) adversarial loss (more details of the loss function will be discussed later).

The network illustrated in FIG. 6 is specialized for the analysis of time-series images through: (1) 3D filters in the neural network that take all the image frames into consideration, and extract the time dependent information naturally, (2) two specifically designed modules in a generator residual network, i.e., Monte Carlo dropout (Gal and Ghahramani, 2015) and denoise shortcut, to cope with the stochastic switching of fluorophores and random noise, and (3) a novel incremental multi-scale architecture and parameter tuning scheme, which is designed to suppress the error accumulation in large upscaling factor neural networks. These features are now discussed in more detail with regard to FIGS. 6 and 7.

Figure 7:
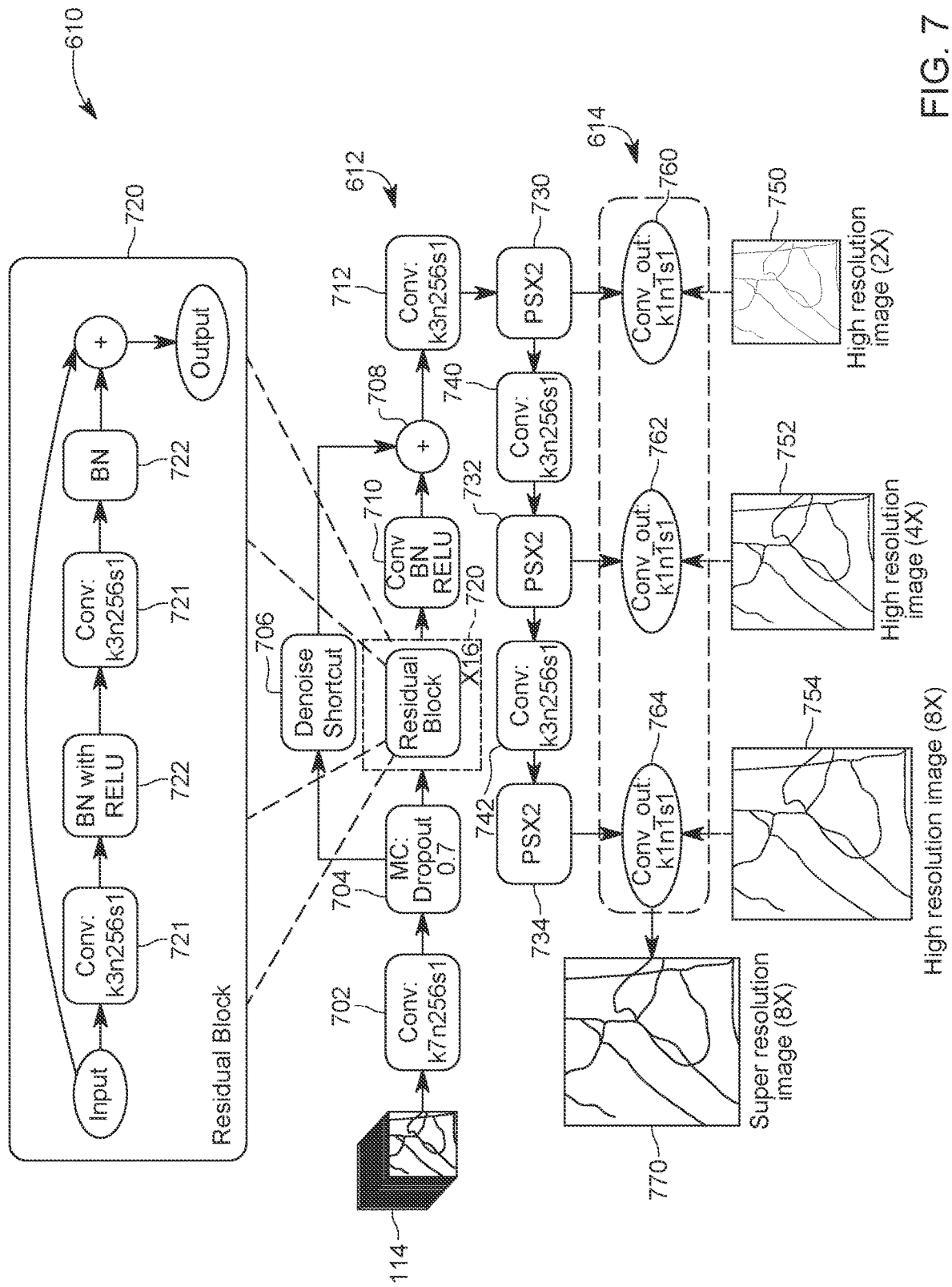
FIG. 7 illustrates details of a residual network module and a multiscale upsampling component of the deep learning module.

The input to the Deep Learning module 120, for the training mode140, is the time-series low-resolution images 114 generated by the Simulation module 110. For the analysis mode 150, the input would be the low-resolution images derived from an actual microscope. The images 114 are fed to the generator model G 610. The generator model G 610 is composed of two components, the residual network module 612 and the multiscale upsampling component 614. The core of the residual network module 612, the residual network building block 720, is shown in FIG. 7. Instead of using a convolutional layer to directly fit the transformation between the input feature map and the output feature map, the residual block720 tries to fit the residue of the output deduced by the input. This architecture is proved to be more effective than the traditional convolutional layer, eliminating the model degradation problem and gradient explosion or vanish problem (He et al., 2016; Lim et al., 2017).

A convolutional layer 702 with a filter size of 7 by 7 (which is larger than the commonly used filter, but other sized can be used) is used to capture meaningful features of the input fluorescence microscope images 114. A Monte Carlo dropout layer 704, which dropout some pixels from the input feature maps during both training and testing, is applied to the output of the first layer 702 to suppress noise. To further alleviate the noise issue, it is possible to use another technique, the denoise shortcut block 706. Block 706 is similar to the identical shortcut in the residual block 720. However, instead of being exactly the same as the input, each channel of the input feature map is set as the average of all the channels. The output from the Monte Carlo dropout layer 704 is provided to both the denoise shortcut block 706 and the residual block 720.

The outputs of these two components 706 and 720 are then added together elementwise at adder 708. In this implementation, the residual network module 612 consists of 16 residual blocks 720. The architecture of a residual block 720 is shown in FIG. 7, as including a convolution layer 721having the kernel size of 3 by 3 and the output channel is 256, with the stride step as 1; a batch normalization layer 722 BN with a rectified linear unit (RELU), which is configured to take the input through a batch normalization layer, followed by the RELU activation, followed by another convolution layer 721 and another BN layer 722. The output of each residual block 720 is fed to the next residual block.

The output of the residual block 720 is fed to a convolutional layer 710 and then added with adder 708 to the output of the denoise shortcut block 706. The convolutional layer 710 is placed after 16 residual blocks720, element-wise. Finally, the residual network module 612 includes one more convolutional layer 712. The output from this layer is then fed to the multiple multiscale upsampling component 614. After this feature map extraction process, the multiscale upsampling component 614 uses pixel shuffle layers 730, 732, and 734 combined with the convolutional layers 740 and 742 to gradually increase the dimensionality of the input image.

The multiscale upsampling component 614, which eliminates the fake details, is composed of several pixel shuffle layers 730, 732 and 734 and plural convolutional layers 740 and 742. Using these layers, the model of FIGS. 6 and 7 is able to process 2×, 4×, and 8× super-resolution images 750, 752, and 754, which means that this model has multiple interfaces 760, 762, and 764 for calculating the training error and performing error backpropagation. Tuning the model carefully using the above techniques, it is possible to obtain a well-trained model, which can capture the hidden structures while not introducing too much fake detail.

The embodiment illustrated in FIG. 7 uses a novel multiscale tuning procedure to stabilize the 8× images. As shown in the figure, the generator model can output and thus calculate the training error of multi-scale super-resolution images, ranging from 2× to 8×, which means that the model has multiple training interfaces 760, 762, and 764 for back propagation. Thus, during training, the Deep Learning module uses the 2×, 4×, 8× high-resolution ground-truth images 750, 752, and 754 to tune the model and simultaneously to ensure that the dimensionality of the images increases smoothly and gradually without introducing too much fake detail.

The multiscale upsampling component 614 includes pixel shuffle layers (PSX2) 730, 732, and 734, and convolutional layers 740 and 742, linked as shown in FIG. 7. This means that the pixel shuffle layers 730, 732, and 734, whose scaling factor is 2, and which is used to perform the upscaling of the figure dimensionality, is capable of outputting 2×, 4×, and 8× high-resolution images 750, 752, and 754. The convolutional layers 760, 762, and 764, whose kernel size is 1 by 1 and the output channel number is 1 with the stride step as 1, were used to convert the feature maps into the final output image 770, which is the super-resolution image. Those output layers provide the training interface for doing error back propagation. Thus, during training, it is possible to gradually tune the model and prevent the 8× image from incorporating too much fake detailed information, which does not exist in the original image.

For the discriminator network D shown in FIG. 6, this embodiment adopts the traditional convolutional neural network module 622, which contains eight convolutional layers (not shown), one residual block (not shown) and one sigmoid layer (not shown). The convolutional layers increase the number of channels gradually to 2048 and then decrease it using 1 by 1 filters. Those convolutional layers are followed by a residual block, which further increases the model ability of extracting features. FIG. 6 also shows that depending on various scores 630 and 632 (where score 630 shows an example the discriminator scoring the super-resolution image generated by the novel model while score 632 shows an example of the discriminator scoring the true high-resolution image), loss of the generator G and discriminator D are evaluated in blocks 640 and 642 (block 640 shows the loss used to train the generator while block 642 shows the loss used to train the discriminator network) and finally the targets 650, 652 and 654 show the ground truth labels, under different circumstances, and are used to calculate the losses of the generator and discriminator.

Using the configurations discussed above for the Simulation module 110 and the Deep Learning module 120, the process of model training 140 and the process of testing 150 is now discussed. The GAN is known to be difficult to train (Salimans et al., 2016). Thus, this embodiment uses the following techniques to obtain stable models. For the generator model G, this embodiment does not train the GAN immediately after initialization. Instead, the model is pre-trained. During the pretraining process, the embodiment minimizes the mean squared error between the super-resolution image 770 (see FIG. 7) and the ground-truth 754 (see FIG. 6), i.e., with the pixel-wise Mean Square Error (MSE) loss as:

$$l_{MSE_\mu}^{SR} = \frac{1}{\mu^2 WH}\sum_x^{\mu W}\sum_y^{\mu H}(G(\mathcal{T}_n, \theta_{G_\mu}) - I_{x,y}^{HR})^2, \quad (5)$$

where W is the width of the low-resolution image, H is the height of the low-resolution image, and μ is the upscaling factor, i.e., 2, 4 and 8. During pretraining, the following quantities are simultaneously optimized: $1_{MSE_8}^{SR}$, $1_{MSE_4}^{SR}$, and $1_{MSE_2}^{SR}$, i.e., the high-resolution images 750, 752, and 754, instead of optimizing a sum of them.

After the model has been well-pretrained, the training of the GAN is initiated. During this process, the VGG (Simonyan and Zisserman, 2014) function is used to calculate the perceptual loss (Johnson et al., 2016) and the Adam optimizer (Kingma and Ba, 2014) is used with learning rate decay as the optimizer. When feeding an image to the VGG model, the image is resized to fulfill the dimensionality requirement given by:

$$l_{VGG_\mu}^{SR} = \sum_{i=1}^{V}(VGG(G(\mathcal{T}_n, \theta_{G_\mu}))_i - VGG(I^{HR})_i)^2, \quad (6)$$

where V is the dimensionality of the VGG embedding output.

During final tuning, this embodiment simultaneously optimizes the 2×, 4×, and 8× upscaling by the generative loss given by:

$$l_{GAN_\mu}^{SR} = 0.4 \cdot l_{MSE_\mu}^{SR} + 10^{-6} \cdot l_{VGG_\mu}^{SR}, \quad (7)$$

and $$l_{GAN_8}^{SR} = 0.5 \cdot l_{MSE_8}^{SR} + 10^{-3} \cdot l_{ADV_8}^{SR} + 10^{-6} \cdot l_{VGG_8}^{SR} \quad (8)$$

where μ=2, 4 for equation (7) and the 8× scaling in equation (8) has an additional term, the adversarial loss $l_{ADV_8}^{SR}$, which may be expressed as $l_{ADV_8}^{SR} = \Sigma_{n=1}^{N}\log(1-D(G(\mathcal{T}_n, \theta_G), \theta_D))$. Thus, it can be seen that equations (7) and (8) describe the layers in the multiscale upsampling component 614, and these equations are used simultaneously for optimizing the respective images 750 to 754, and the 8× scaling image has an expression different from the 2× and 4× scaling. Further, the expression used for the 8× scaling image has an extra term relative to the expressions for the 2× and 4× scaling.

For the discriminator network D, the following loss function is used:

$$l_{DIS}^{SR} = \sum_{n=1}^{N}\log(D(G(\mathcal{T}_n, \theta_G), \theta_D)) + \sum_{n=1}^{N}\log(1 - D(I_n^{HR}, \theta_D)). \quad (9)$$

Using the expressions noted above during testing, for the same input time-series images, the model was run multiple times to get a series of super-resolution images 770. Because of the Monte Carlo dropout layer 704 in the generator model G, all of the super-resolution images are not identical. Then, the average of these images was computed as the final prediction, with another map showing the p-value of each pixel. A Tensor flow was used in combination with Tensor Layer (Dong et al., 2017) to implement the deep learning module. Trained on a workstation with one Pascal Titan X, the model converges in about 8 hours, which is much faster than the existing algorithms.

To further improve the testing mode 150, it is possible to use the Bayesian module 130 to select an accurate final output image 132. However, this module is optional. The Bayesian inference module 130 takes both the time-series low-resolution images 114 and the primitive super-resolution image 770 produced by the Deep Learning module 120 as inputs, and generates a set of optimized fluorophore locations, which are further interpreted as a high-confident super-resolution image. Because the Deep Learning module has already depicted the ultra-structures in the image, these structures are used as the initialization of the fluorophore locations, re-sampling with a random punishment against artifacts. For each pixel, this module re-samples the fluorophore intensity by $\sqrt{I_{x,y}}$, and the location by $(x, y) \pm \text{rand}(x, y)$, where $I_{x,y}$ is the pixel value in the image produced by the Deep Learning module, and rand(x, y) is limited to ±8. In this way, the extremely high illumination can be suppressed and fake structures will be re-estimated.

For training the Deep Learning module 120, the stochastic Simulation module 110 was used to simulate time-series low-resolution images 114 from 12,000 gray-scale high-resolution images. These images were downloaded from two databases: (i) 4,000 natural images were downloaded from ILSVRC (Russakovsky et al., 2015) and Laplace filtered, and (ii) 8,000 sketches were downloaded from the Sketchy Database (Sangkloy et al., 2016). Note that this simulation is a generic method, which does not depend on the type of the input images. Thus, any gray-scale image can be interpreted as the fluorophore distribution and used to generate the corresponding time-series low-resolution images 114.

To initialize all the weights of the Deep Learning models, a random normal initializer was used with the mean as 0 and standard deviation as 0.02. For the Monte Carlo dropout layer 704, the keep ratio was set at 0.8. In terms of the Adam optimizer, the settings noted in (Li et al., 2018; Dai et al., 2017) were used, the learning rate was set as $1 \cdot 10^{-4}$, and the beta_1, which is the exponential decay rate for the first moment estimates, was set to be 0.9. During training, the batch size was set to be 8, the initialization training epoch was set to be 2, and the GAN training epoch was set to be 40. When performing the real GAN training, the learning rate decay technique was used, reducing the learning rate by half every 10 epochs. One skilled in the art would understand that these specific examples are not limiting the novel concepts, and they are only presented to enable one skilled in the art to reproduce the present calculations.

Figure 8:
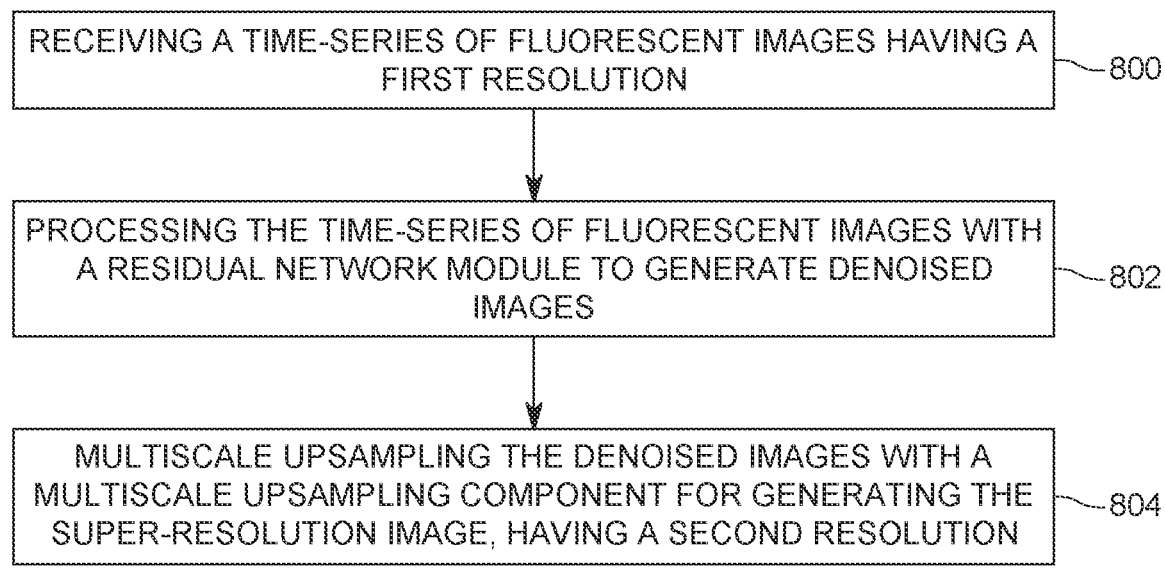
FIG. 8 is a flowchart of a method for generating the super-resolution image.

According to the logic illustrated in FIGS. 6 and 7, a method for generating a super-resolution image 770 is now discussed with regard to FIG. 8. The method includes a step 800 of receiving a time-series of fluorescent images 114 having a first resolution, a step 802 of processing the time-series of fluorescent images 114 with a residual network module 612 to generate denoised images, and a step 804 of multiscale upsampling the denoised images with a multiscale upsampling component 614 for generating the super-resolution image 770, having a second resolution. The second resolution is larger than the first resolution, and the second resolution is beyond a diffraction limit of light.

The step of processing may include applying a Monte Carlo dropout layer to the time-series of fluorescent images, and applying an output of the Monte Carlo dropout layer 704 simultaneously to (1) a residual block 720 and (2) a denoise shortcut layer 706. In one application, the residual block applies a convolution layer, a batch normalization layer, followed by another convolution layer and another batch normalization layer. In another application, an output of the residual block and an output of the denoise shortcut layer are added together and supplied to the multiscale upsampling component. The multiscale upsampling component increases a resolution of an image by a factor of 2, multiple times, which results in plural parameter tuning interfaces and plural high-resolution ground-truth images.

The method may further include a step of using the plural parameter tuning interfaces to generate the super-resolution image based on the plural high-resolution ground-truth images, and/or a step of simultaneously using the plural high-resolution ground-truth images to generate the super-resolution image. The methods discussed above may be performed one after another, or separately.

To estimate the performance of the proposed methods, two simulated datasets and three real-world datasets were used. Simulated datasets are used due to the availability of ground-truth.

The first two datasets are simulated datasets, for which the ground-truth (i.e., high-resolution images) is downloaded from the Single-Molecule Localization Microscopy (SMLM) challenge (Sage et al., 2015). The two datasets correspond to two structures: MT0.N1.HD (abbr. MT herein) and Tubulin ConjAL647 (abbr. Tub herein). For each structure, single molecule positions were downloaded and then transformed to fluorophore densities according to the logic embedded into the stochastic Simulation module 110. For simulation, the photo-convertible fluorescent protein (PCFP) mEos3.2 (Zhang et al., 2012) and its associated PSF, FWHM and state transfer table were used. For the convenience of calculation, the large-field structure was cropped into four separate areas, each with 480×480 pixels (1 px=20 nm). For each high-resolution image, 200 frames of low-resolution fluorescent images were generated (as discussed with regard to FIG. 3), each with 60×60 pixels.

The third dataset is a real-world dataset, which was used in recent work (Xu et al., 2017). The actin was labeled with mEos3.2 in U2OS cells (abbr. Actin1) and taken with an exposure time of 50 ms per image frame. The actin network is highly dynamic and exhibits different subtype structures criss-crossing at various distances and angles, including stress fibers and bundles with different sizes and diameters. The dataset has 200 frames of high-density fluorescent images, each with 249×395 pixels (1 px=160 nm) in the green channel. This is a good benchmark set that has been well tested which can compare the present method with SIMBA (Xu et al., 2017), a recent Bayesian approach based on dual-channel imaging and photo-convertible fluorescent proteins.

Two other real-world datasets labeled with mEos3.2 were also used. One is an actin cytoskeleton network (abbr. Actin2), which is labeled and taken under a similar exposure condition with Actin1, but is completely new and has not been used by previous works. The other one is an Endoplasmic reticulum structure (abbr. ER), which has a more complex structure. It is a type of organelle that forms an interconnected network of flattened, membrane-enclosed sacs or tubes known as cisternae, which exhibits different circular-structures and connections at different scales. For the ER dataset, the exposure time is 6.7 ms per frame. The resolution of each image in Actin2 is 263×337 pixels (1 px=160 nm) and that in ER is 256×170 pixels (1 px=100 nm). Both datasets have 200 frames of high-density fluorescent images and the same photographing parameters as Actin1. These datasets were used to demonstrate the power of the present method in diverse ultra-structures.

Since the 3B analysis (Cox et al., 2012) is one of the most widely used high-density fluorescent super-resolution techniques, which can deal with high temporal and spatial resolutions (Lidke,2012; Cox et al., 2012), it was chosen as reference to compare with the present method.

Figure 9A:
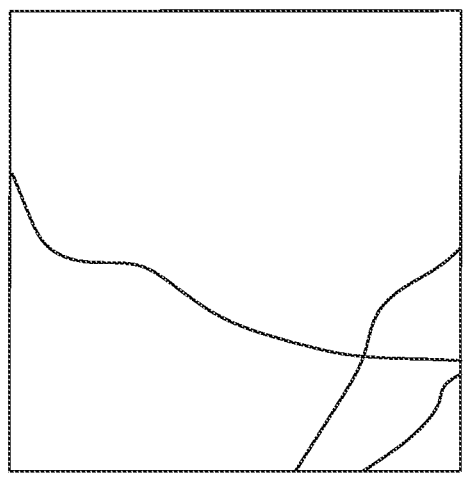
FIGS. 9A to 9X compare the reconstructed images of the present method with those of the traditional methods.
Figure 9B:
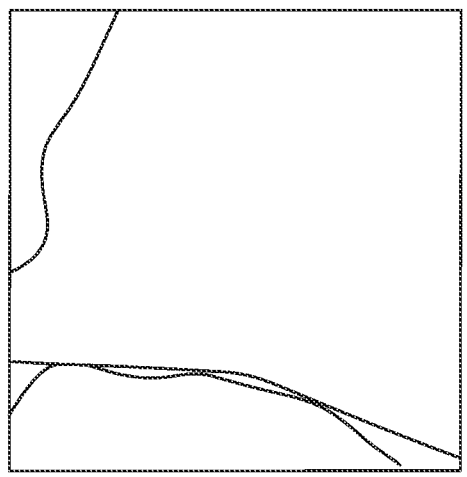
Figure 9C:
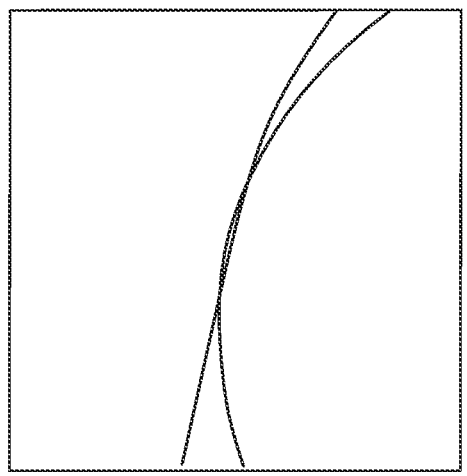
Figure 9D:
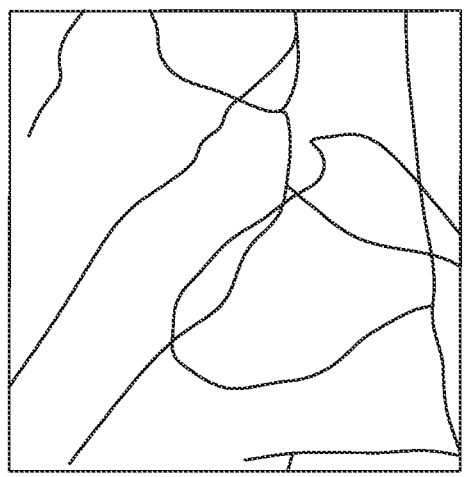
Figure 9E:
Figure 9F:
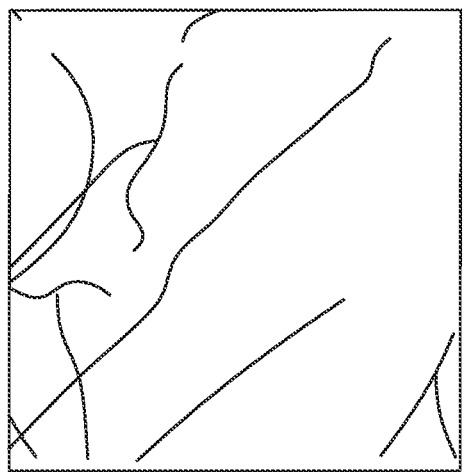
Figure 9G:
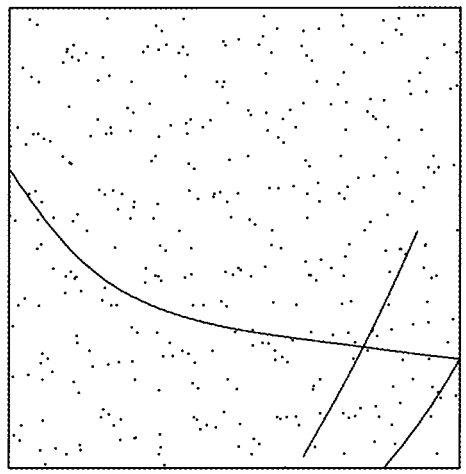
Figure 9H:
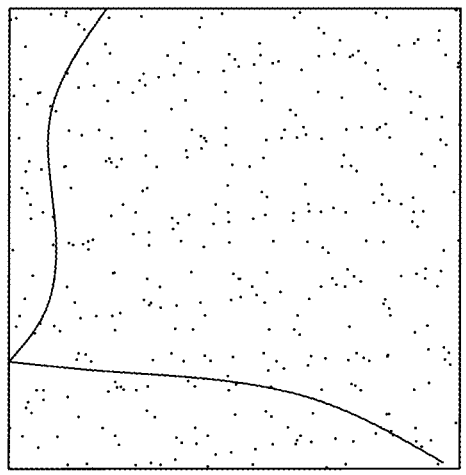
Figure 9I:
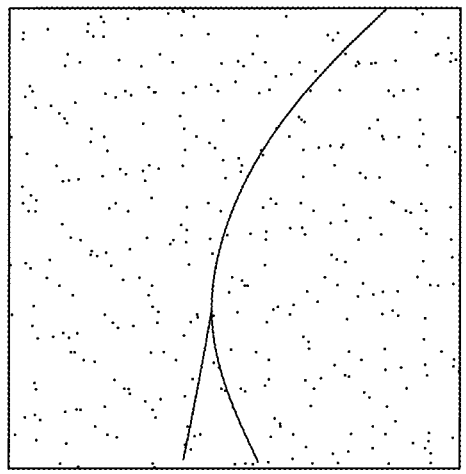
Figure 9J:
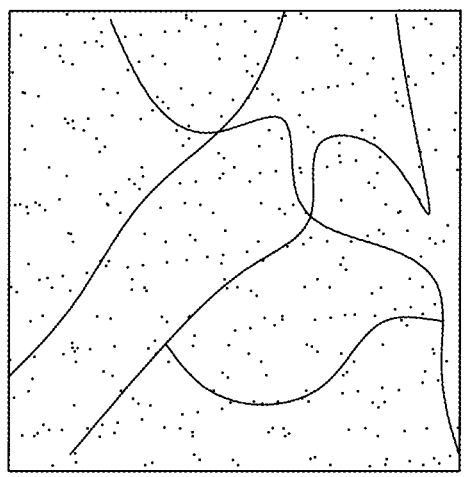
Figure 9K:
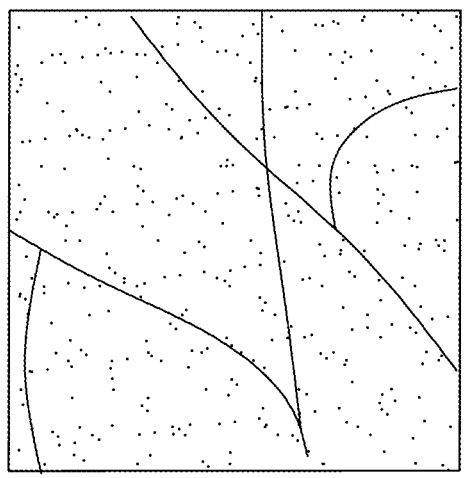
Figure 9L:
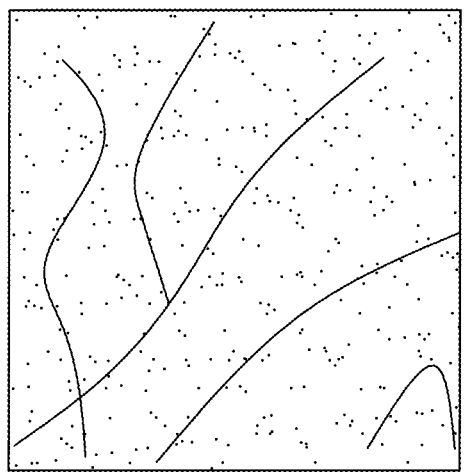
Figure 9M:
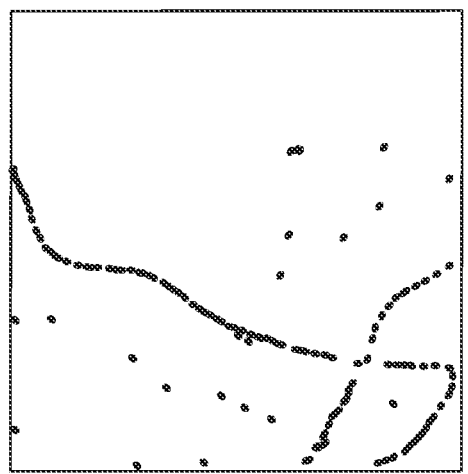
Figure 9N:
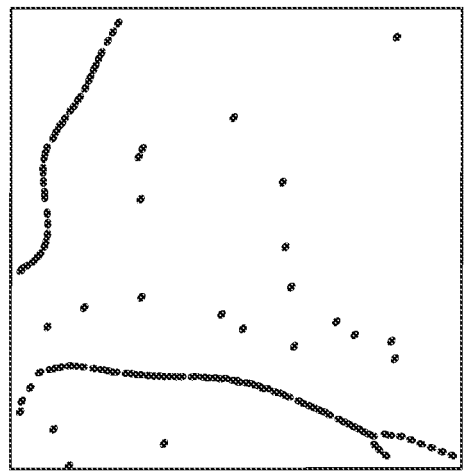
Figure 9O:
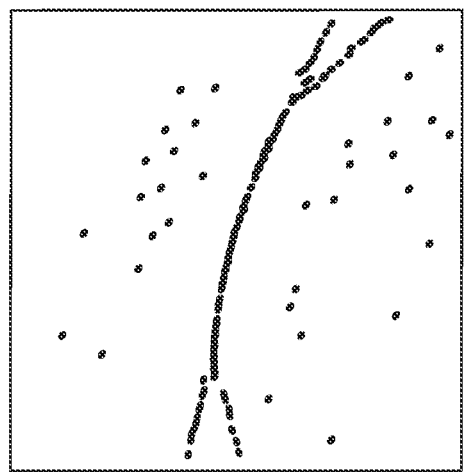
Figure 9P:
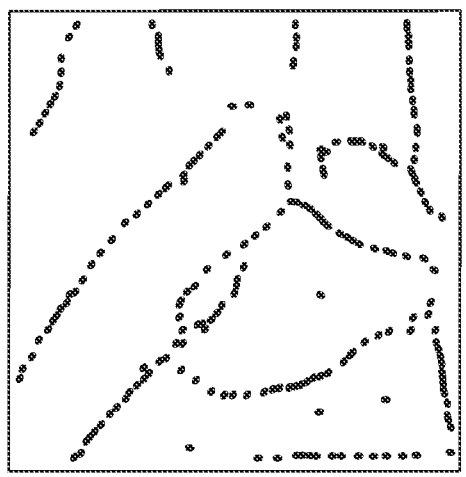
Figure 9Q:
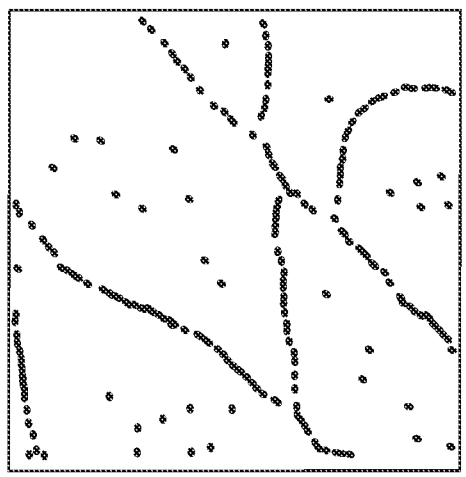
Figure 9R:
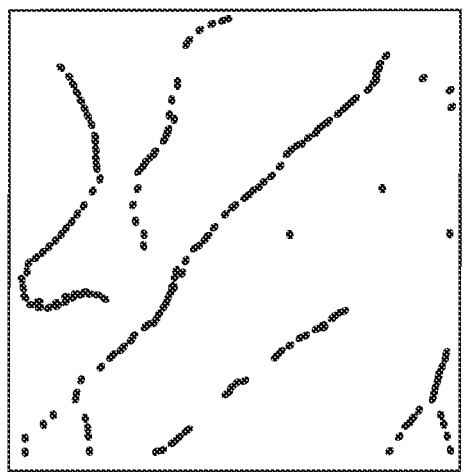
Figure 9S:
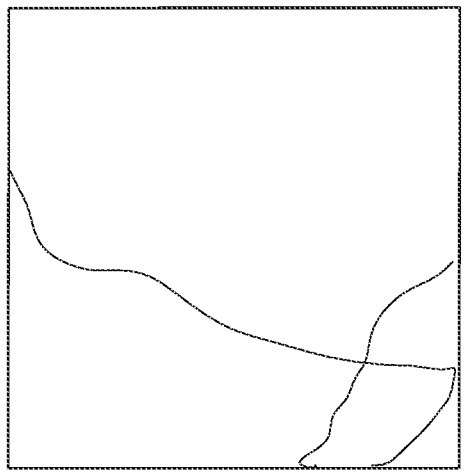
Figure 9T:
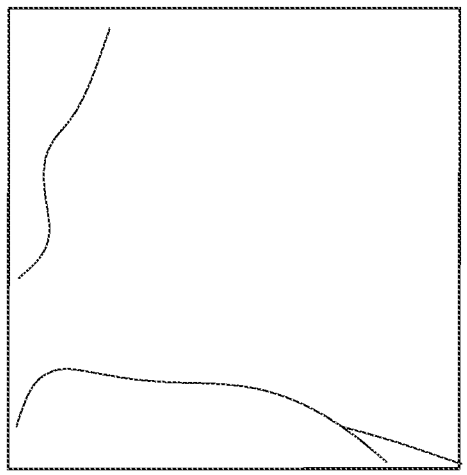
Figure 9U:
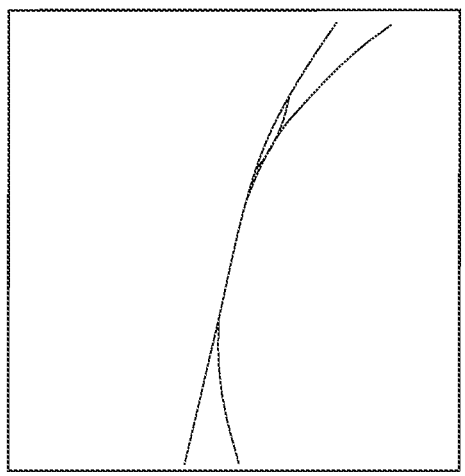
Figure 9V:
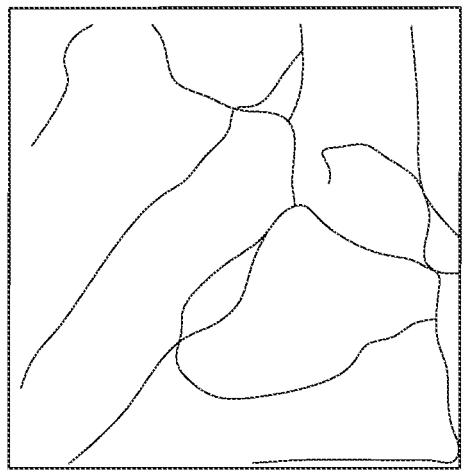
Figure 9W:
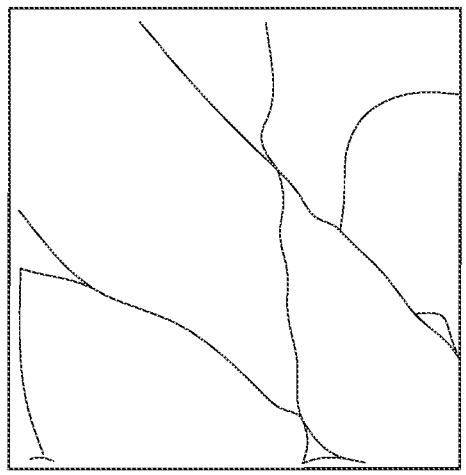
Figure 9X:
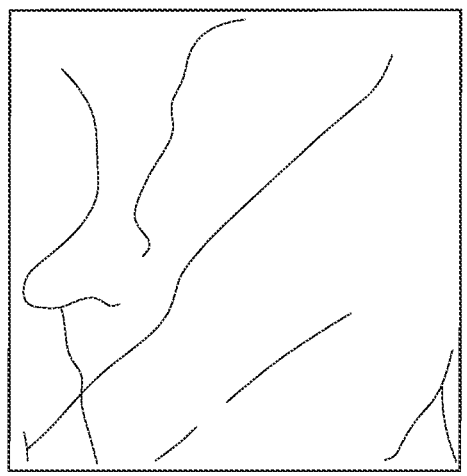

FIGS. 9A-9X show the visualization of (1) the ground-truth high-resolution images, (2) representative low-resolution input images, (3) the reconstruction results of the 3B analysis, and (4) the results of the present method on the simulated datasets. FIGS. 9A to 9F illustrate the ground-truth high-resolution images for the MT (first three figures) and for the Tub (last three figures), FIGS. 9G to 9L illustrate the first frames of the simulated time-series low-resolution images, FIGS. 9M to 9R illustrate the reconstruction results of the 3B analysis, and FIGS. 9S to 9X illustrate the reconstruction results of the present method. When comparing the results of the 3B analysis (FIGS. 9M to 9R) with the results of the present method (FIGS. 9S to 9X) one would note that the results of the present method are crisper and clearer than the results of the 3B analysis.

As shown in FIGS. 9A to 9F, the ground-truth images have very clear structures while the low-resolution image frames 9G to 9L are very blurry and noisy (8×downsampled). To reconstruct the ultra-structures, the 3B analysis was run with 240 iterations and the present method ran the Bayesian inference module during 60 iterations. In each iteration, the Bayesian inference module of the present method searches four neighbor points for each fluorophore, whereas the 3B analysis takes isolated estimation strategy. Thus, the difference in iteration numbers is comparable. Due to the high computational expense of the 3B analysis, each 60×60 image was subdivided into nine overlapped subareas for multi-core process, whereas for the present method, the entire image was processed by a single CPU core.

It is clear that the reconstructions of the present method are very similar to the ground-truth in terms of smoothness, continuity, and thickness. On the other hand, the reconstructions of the 3B analysis consist of a number of interrupted short lines and points with thin structures. In general, two conclusions can be drawn from the visual inspection of the results in FIGS. 9A to 9X.

First, the present method discovered much more natural structures than the 3B analysis. For example, in the bottom part of FIG. 9B, there are two lines overlapping with each other and a bifurcation at the tail. Due to the very low resolution in the input time-series images (e.g., FIG. 9H), neither the present method nor the 3B analysis was able to recover the overlapping structure. However, the present method reconstructed the proper thickness of that structure (see FIG. 9T), whereas the 3B analysis only recovered a very thin line structure (see FIG. 9N). Moreover, the bifurcation structure was reconstructed naturally by the present method. Similar conclusions can be drawn on the more complex structures in the Tub dataset (FIGS. 9D-9F, 9J-9L, 9P-9R and 9V-9X).

Second, the present method discovered much more latent structures than the 3B analysis. The Tub dataset consists of a lot of lines (tubulins) with diverse curvature degrees (see FIGS. 9D, 9E, and 9F). The reconstructions of the 3B analysis successfully revealed most of the tubulin structures, but left the crossing parts interrupted (see FIGS. 9P, 9Q, and 9R). As a comparison, the reconstruction results of the present method recovered both the line-like tubulin structures and most of the crossing parts accurately (see FIGS. 9V, 9W, and 9X).

Figure 10:
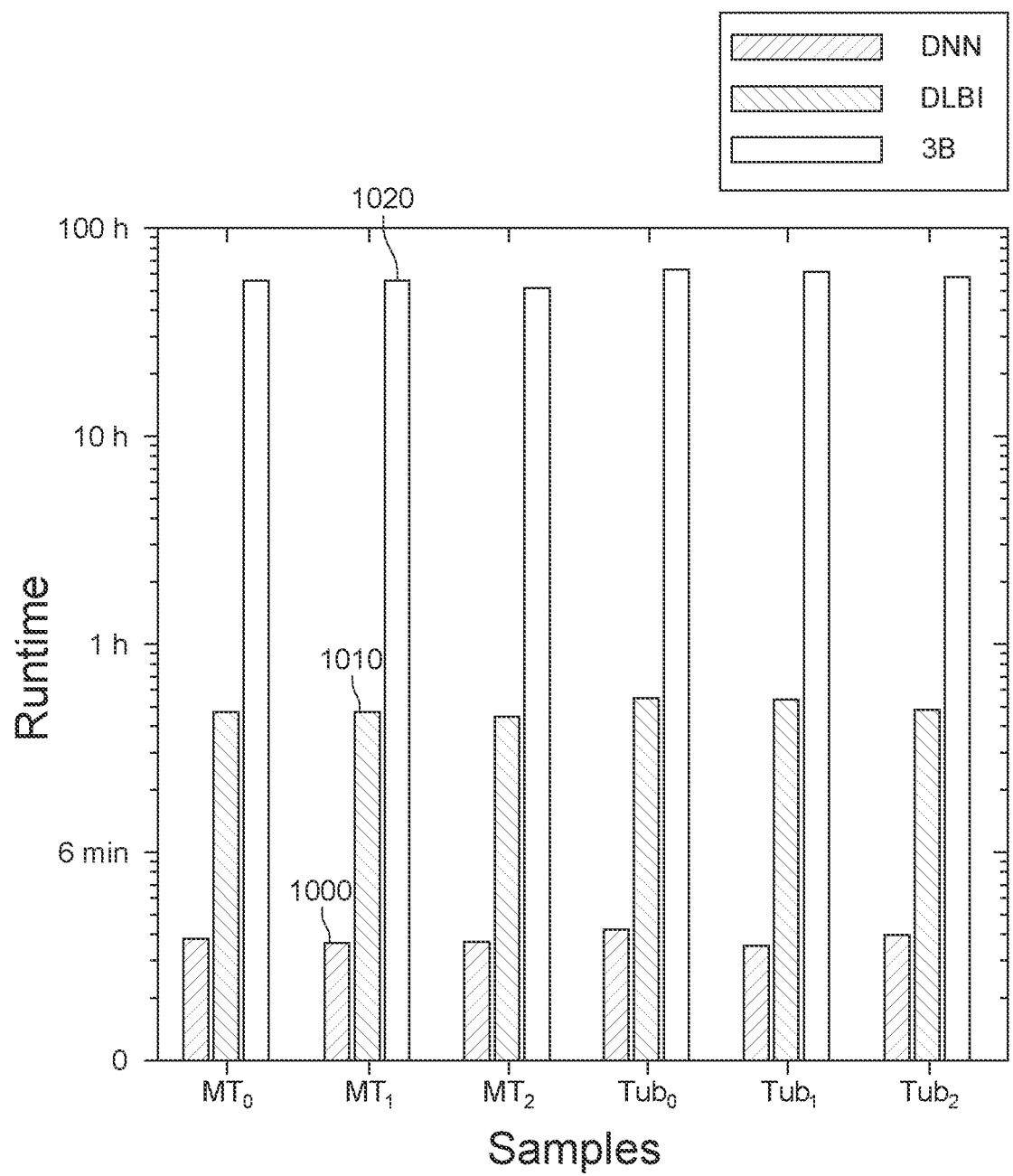
FIG. 10 compares runtimes of various methods for generating the super-resolution image.

A Runtime analysis of the present method and the 3B method has been performed as now discussed. After being trained, running the deep learning model is very computationally inexpensive. Furthermore, the results of deep learning provide a close-to-optimal initialization for Bayesian inference, which also significantly reduces trial-and-error and leads to faster convergence. FIG. 10 shows the runtime 1000 of the Deep Learning module 110, the runtime 1010 of the entire method, and the runtime 1020 of the 3B analysis on the nine reconstruction tasks (i.e., the six areas of the simulated datasets shown in FIGS. 9A to 9X). It can be seen that the runtime for the Deep Learning module ranges between 1 to 3 minutes and that of the entire present method ranges between 30 to 40 minutes. In contrast, the runtime for the 3B analysis is around 75 hours, which is more than 110 times higher than that for the present method. These results demonstrate that the super-resolution images generated with the deep learning module alone is a good estimation to the ground-truth. Therefore, for users who value time and can compromise accuracy, the results from the Deep Learning module 110 alone provide a good tradeoff, and thus a good estimation of the ground-truth.

The present method is also capable of large-field reconstruction. A large-field is defined as an area that includes at least 100×100 pixels. To analyze a dataset with 200 frames, each with about 200×300 pixels, it takes the present method about 7~10 hours on a single CPU core. Therefore, the present method is able to achieve large-field reconstruction. When the three real datasets were used with the present method, the large-field reconstruction images were as follows: for the Actin1dataset, the selected area was 200×300 pixels and the reconstructed super-resolution image was 1600×2400 pixels. For the Actin2 dataset, the selected area was 250×240 pixels and the reconstructed image was 2000×1920 pixels. For the ER dataset, the selected area was 200×150 pixels and the reconstructed image was 1600×1200 pixels.

The actin networks in the two datasets have been successfully recovered by the present method. The thinning and thickening trends of the cytoskeleton have been clearly depicted, as well as the small latent structures, including actin filaments, actin bundles and ruffles. For the endoplasmic reticulum structure, the circular-structures and connections of the cytoskeleton have also been accurately reconstructed.

For the Actin1 dataset, the single-molecule reconstruction of the red channel is available. This reconstruction was produced by PALM (Hess et al., 2006) using 20,000 frames, whereas the reconstruction image of the present method used only 200 frames. The image produced by the present was overlap with that of PALM to check how well they overlap. A review of this overlap indicates that the main structures of the two images almost perfectly agree with each other.

Figure 11:
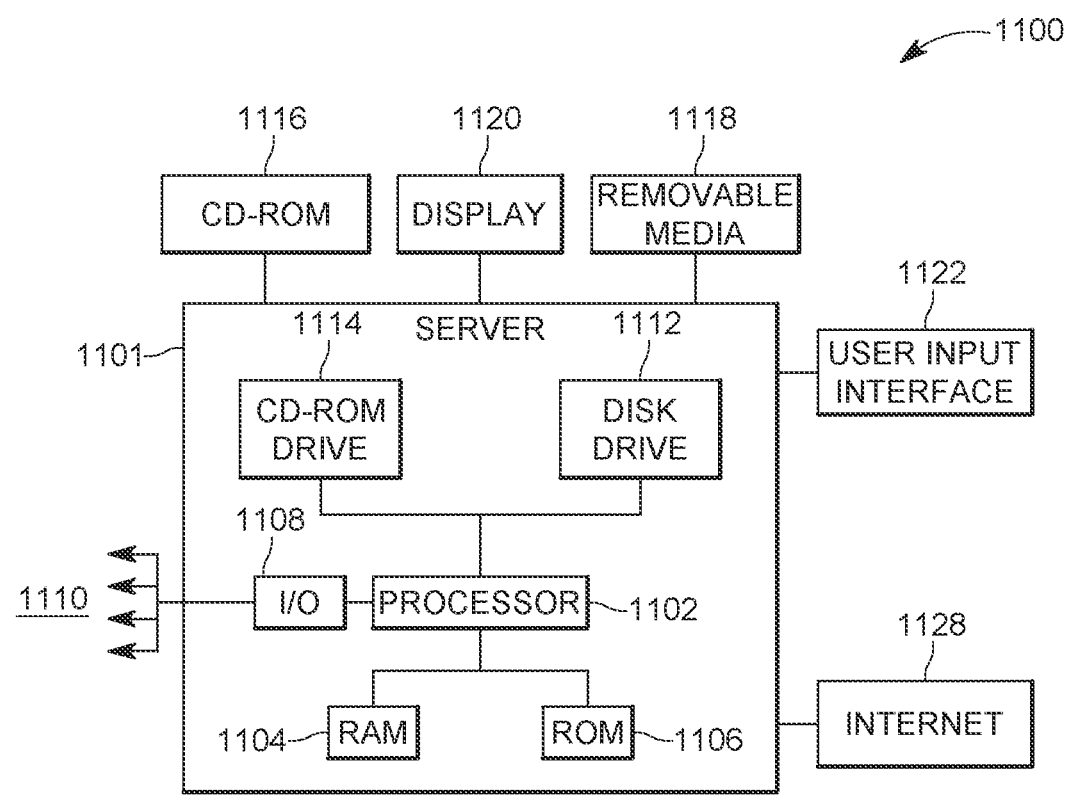
FIG. 11 is a schematic diagram of a computing device that implements the above discussed methods.

The above-discussed procedures and methods may be implemented in a computing device or controller as illustrated in FIG. 11. Hardware, firmware, software or a combination thereof may be used to perform the various steps and operations described herein. Computing device 1100 of FIG. 11 is an exemplary computing structure that may be used in connection with such a system. In one application, any of the Simulator module 110 and the Deep Learning module 120 may be implemented in the computing device 1100.

Computing device 1100 suitable for performing the activities described in the embodiments may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. Processor 1102 carries out a variety of functions as are known in the art, as dictated by software and/or firmware instructions.

Server 1101 may also include one or more data storage devices, including hard drives 1112, CD-ROM drives 1114, and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as a smart device, e.g., a phone, tv set, computer, etc. The server may be part of a larger network configuration as in a global area network (GAN) such as the Internet 1128, which allows ultimate connection to various landline and/or mobile computing devices.

The disclosed embodiments provide methods and mechanisms for structure reconstruction of super-resolution fluorescence microscopy. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Abadi, M. (2016). Tensorflow: Learning functions at scale. AcmSigplan Notices,51(9), 1-1.

ASchwentker, M., Bock, H., Hofmann, M., Jakobs, S., Bewersdorf, J., Eggeling, C., and Hell, S. W. (2007). Widefield subdiffractionresolft microscopy using fluorescent protein photoswitching. *Microscopy research and technique,* 70(3), 269-280.

Cox, S., Rosten, E., Monypenny, J., Jovanovic-Talisman, T., Burnette, D. T., Lippincott-Schwartz, J., Jones, G. E., and Heintzmann, R. (2012). Bayesian localization microscopy reveals nanoscale podosome dynamics. *Nat. methods,* 9(2), 195-200.

Dai, H., Umarov, R., Kuwahara, H., Li, Y., Song, L., and Gao, X. (2017). Sequence2vec: a novel embedding approach for modeling transcription factor binding affinity landscape. *Bioinformatics (Oxford, England),* 33, 3575-3583.

Dong, H., Supratak, A., Mai, L., Liu, F., Oehmichen, A., Yu, S., and Guo, Y. (2017). Tensorlayer: A versatile library for efficient deep learning development. In *Proceedings of the 2017 ACM on Multimedia Conference,* pages 1201-1204. ACM.

Gal, Y. and Ghahramani, Z. (2015). Dropout as a Bayesian Approximation: Representing Model Uncertainty in Deep Learning. *arXiv.*

Goodfellow, I., Pouget-Abadie, J., Mirza, M., Xu, B., Warde-Farley, D., Ozair, S., Courville, A., and Bengio, Y. (2014). Generative adversarial nets. In *Advances in neural information processing systems,* pages 2672-2680.

Gustafsson, M. G. (2005). Nonlinear structured-illumination microscopy: wide-field fluorescence imaging with theoretically unlimited resolution. *P. Natl. Acad. Sci. USA,* 102(37), 13081-13086.

He, K. M., Zhang, X. Y., Ren, S. Q., and Sun, J. (2016). Deep residual learning for image recognition. 2016 *Ieee Conference on Computer Vision and Pattern Recognition (Cpvr),* pages 770-778.

Hein, B., Willig, K. I., and Hell, S. W. (2008). Stimulated emission depletion (sted) nanoscopy of a fluorescent protein-labeled organelle inside a living cell. *Proceedings of the National Academy of Sciences,* 105(38), 14271-14276.

Hess, S. T., Girirajan, T. P., and Mason, M. D. (2006). Ultra-high resolution imaging by fluorescence photoactivation localization microscopy. *Biophys. J.,* 91(11), 4258-4272.

Holden, S. J., Uphoff, S., and Kapanidis, A. N. (2011). Daostorm: an algorithm for high-density super-resolution microscopy. *Nat. methods,* 8(4), 279-280.

Huang, F., Schwartz, S. L., Byars, J. M., and Lidke, K. A. (2011). Simultaneous multiple-emitter fitting for single molecule super-resolution imaging. *Biomed.Opt. Express,* 2(5), 1377-1393.

Johnson, J., Alahi, A., and Fei-Fei, L. (2016). Perceptual losses for real-time style transfer and super-resolution. In *European Conference on Computer Vision,* pages 694-711. Springer.

Kim, J., Kwon Lee, J., and Mu Lee, K. (2016). Accurate image super-resolution using very deep convolutional networks. In *Proc. IEEE Conference on Computer Vision and Pattern Recognition,* pages 1646-1654.

Kingma, D. and Ba, J. (2014). Adam: A method for stochastic optimization. *arXivpreprint arXiv:*1412.6980.

Ledig, C., Theis, L., Husza'r, F., Caballero, J., Cunningham, A., Acosta, A., Aitken, A., Tejani, A., Totz, J., Wang, Z., et al. (2016). Photo-realistic single image super-resolution using a generative adversarial network. *arXiv preprint arXiv:*1609.04802.

Li, Y., Wang, S., Umarov, R., Xie, B., Fan, M., Li, L., and Gao, X. (2018). Deepre: sequence-based enzyme ec number prediction by deep learning. *Bioinformatics*, 34(5), 760-769.

Lidke, K. A. (2012). Super resolution for common probes and common microscopes. *Nat. methods*, 9(2), 139.

Lim, B., Son, S., Kim, H., Nah, S., and Lee, K. M. (2017). Enhanced deep residual networks for single image super-resolution. In The *IEEE Conference on Computer Vision and Pattern Recognition (CVPR) Workshops*, volume 2.

Lippincott-Schwartz, J. and Manley, S. (2009). Putting super-resolution fluorescence microscopy to work. *Nat. methods*, 6(1), 21-23.

Quan, T., Zhu, H., Liu, X., Liu, Y., Ding, J., Zeng, S., and Huang, Z.-L. (2011). High-density localization of active molecules using structured sparse model and bayesian information criterion. *Opt. express*, 19(18), 16963-16974.

Russakovsky, O., Deng, J., Su, H., Krause, J., Satheesh, S., Ma, S., Huang, Z., Karpathy, A., Khosla, A., Bernstein, M., Berg, A. C., and Fei-Fei, L. (2015). ImageNet Large Scale Visual Recognition Challenge. *Int. J. Comput. Vision*, 115 (3), 211-252.

Rust, M. J., Bates, M., and Zhuang, X. (2006). Sub-diffraction-limit imaging by stochastic optical reconstruction microscopy (storm). *Nat. methods*, 3(10), 793— 796.

Sage, D., Kirshner, H., Pengo, T., Stuurman, N., Min, J., Manley, S., and Unser, M. (2015). Quantitative evaluation of software packages for single-molecule localization microscopy. *Nat. methods*, 12(8), 717-724.

Salimans, T., Goodfellow, I. J., Zaremba, W., Cheung, V., Radford, A., and Chen,X. (2016). Improved techniques for training gans. *CoRR*, abs/1606.03498.

Sangkloy, P., Burnell, N., Ham, C., and Hays, J. (2016). The sketchy database:learning to retrieve badly drawn bunnies. *ACM T. Graphic.*, 35(4), 119.

Simonyan, K. and Zisserman, A. (2014). Very deep convolutional networks for large-scale image recognition. *arXiv preprint arXiv:*1409.1556.

Xu, F., Zhang, M., He, W., Han, R., Xue, F., Liu, Z., Zhang, F., Lippincott-Schwartz, J., and Xu, P. (2017). Live cell single molecule-guided bayesian localization super resolution microscopy. *Cell Res.*, 27(5), 713.

Zhang, M., Chang, H., Zhang, Y., Yu, J., Wu, L., Ji, W., Chen, J., Liu, B., Lu, J., Liu, Y., et al. (2012). Rational design of true monomeric and bright photoactivatable fluorescent proteins. *Nat. methods*, 9(7), 727-729.

Zhu, L., Zhang, W., Elnatan, D., and Huang, B. (2012). Faster storm using compressed sensing. *Nat. methods*, 9(7), 721-723.

What is claimed is:

1. A method for generating a super-resolution image, the method comprising:
receiving a time-series of fluorescent images having a first resolution;
processing the time-series of fluorescent images with a residual network module to generate denoised images; and
multiscale upsampling the denoised images with a multiscale upsampling component for generating the super-resolution image, having a second resolution,
wherein the second resolution is larger than the first resolution,
wherein the second resolution is beyond a diffraction limit of light, and
wherein the step of processing comprises:
applying a Monte Carlo dropout layer to the time-series of fluorescent images; and
applying an output of the Monte Carlo dropout layer simultaneously to (1) a residual block and (2) a denoise shortcut layer.

2. The method of claim 1, wherein the residual block applies a convolution layer, a batch normalization layer, followed by another convolution layer and another batch normalization layer.

3. The method of claim 1, wherein an output of the residual block and an output of the denoise shortcut layer are added together and supplied to the multiscale upsampling component.

4. The method of claim 1, wherein the multiscale upsampling component increases a resolution of an image by a factor of 2, multiple times, which results in plural parameter tuning interfaces and plural high-resolution ground-truth images.

5. The method of claim 4, further comprising:
using the plural parameter tuning interfaces to generate the super-resolution image based on the plural high-resolution ground-truth images.

6. The method of claim 4, further comprising:
using simultaneously the plural high-resolution ground-truth images to generate the super-resolution image.

7. A computing device for generating a structure for super-resolution fluorescence microscopy, the computing device comprising:
an interface for receiving a time-series of fluorescent images having a first resolution; and
a processor connected to the interface and configured to,
process the time-series of fluorescent images with a residual network module to generate denoised images; and
multiscale upsample the denoised images with a multiscale upsampling component for generating the super-resolution image, having a second resolution,
wherein the second resolution is larger than the first resolution,
wherein the second resolution is beyond a diffraction limit of light, and
wherein the residual network module is configured to,
apply a Monte Carlo dropout layer to the time-series of fluorescent images; and
apply an output of the Monte Carlo dropout layer simultaneously to (1) a residual block and (2) a denoise shortcut layer.

8. The device of claim 7, wherein the multiscale upsampling component is configured to,
increase a resolution of an image by a factor of 2, multiple times, which results in plural parameter tuning interfaces and plural high-resolution ground-truth images;
use the plural parameter tuning interfaces to generate the super-resolution image based on the plural high-resolution ground-truth images; and
use simultaneously the plural high-resolution ground-truth images to generate the super-resolution image.

* * * * *